(12) United States Patent
Ferringo et al.

(10) Patent No.: US 9,460,592 B2
(45) Date of Patent: Oct. 4, 2016

(54) HUMAN AUDIBLE LOCALIZATION FOR SOUND EMITTING DEVICES

(71) Applicant: BlackBerry Limited, Waterloo, Ontario (CA)

(72) Inventors: Bradley Shayne Ferringo, Marco Island, FL (US); John Patrick Grenn, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 400 days.

(21) Appl. No.: 14/225,506

(22) Filed: Mar. 26, 2014

(65) Prior Publication Data

US 2014/0203910 A1    Jul. 24, 2014

Related U.S. Application Data

(63) Continuation of application No. 13/214,354, filed on Aug. 22, 2011, now Pat. No. 8,723,656.

(60) Provisional application No. 61/449,356, filed on Mar. 4, 2011.

(51) Int. Cl.
| | | |
|---|---|---|
| *G08B 3/10* | (2006.01) | |
| *G01S 1/72* | (2006.01) | |
| *G08B 21/24* | (2006.01) | |

(52) U.S. Cl.
CPC ............... *G08B 3/10* (2013.01); *G01S 1/725* (2013.01); *G08B 21/24* (2013.01)

(58) Field of Classification Search
CPC ..... H04W 4/02; H04W 4/021; H04W 4/008; H04W 64/00; H04W 12/06; H04W 12/12; H04W 4/023

USPC ......................................................... 340/8.1
See application file for complete search history.

(56) References Cited

U.S. PATENT DOCUMENTS

| | | |
|---|---|---|
| 3,261,915 A | 7/1966 | Gonke et al. |
| 4,926,159 A | 5/1990 | Bartlett |

(Continued)

FOREIGN PATENT DOCUMENTS

| | | |
|---|---|---|
| CN | 101017597 | 8/2007 |
| CN | 201383193 | 1/2010 |

OTHER PUBLICATIONS

EESR dated Apr. 20, 2012 EP 11178337.

(Continued)

*Primary Examiner* — Mark Blouin
(74) *Attorney, Agent, or Firm* — Jeffrey N. Giunta; Fleit Gibbons Gutman Bongini & Bianco P.L.

(57) ABSTRACT

Audible signals are created and emitted that provide a human user with improved sound localization cues to quickly and efficiently find the emitting device. The different audible signals have been observed to efficiently help a human locate emitting devices that are either in close proximity to the user or that are a large distance from the user. Additionally some examples emit audible signals that have been observed to efficiently help a human locate emitting devices that are located inside a sealed enclosure, such as a box. Some audible signals include audible noise processed by band-pass filters with spectral peaks at about 500 Hz, 4 kHz, and 8 Khz. Such audible signals are alternately emitted in time with audible signals having simultaneously occurring fundamental tone frequencies that each have harmonic components.

20 Claims, 15 Drawing Sheets

(56) References Cited

U.S. PATENT DOCUMENTS

| | | |
|---|---|---|
| 6,201,470 B1 | 3/2001 | Withington |
| 2004/0022392 A1 | 2/2004 | Griesinger |
| 2007/0063822 A1 | 3/2007 | Withington et al. |
| 2007/0109120 A1 | 5/2007 | Schaefer |
| 2007/0279242 A1 | 12/2007 | Plocher et al. |

OTHER PUBLICATIONS

National Fire Protection Association: "NFPA 72, Nation Fire Alarm Code, 2007 Edition," American National standard, XP002672837, USA Retrieved from the Internet: URL:http://www.hochiki-fire.vn/hotro/2011324153336_NFPA72(2007).pdf [retrieval on Apr. 3, 2012] *A.7.4.6.2: fourth Paragraph*.

Hartmann, W.M., "How We Localize Sound," Physics Today on the Web, Michigan State University Acoustics/Psychoacoustics, copyright 1999 American Institute of Physics.

Creative Visions Foundation—Are You a Creative Activist, Audible Exit Sign Can Help Reduce Evacuation Time, Apr. 21, 2005.

O'Connor, D.J., "Directional Sound," NFPA Journal, May/Jun. 2005.

O'Connor, D.J., "The Psychoacoustic Basis and Implementation of Directional Sounders," 2006.

Hartmann, W.M., "Some Psychoacoustical Experiments with All-Pass Networks," 1979 American Association of Physics Teachers, Am.J.Phys, 47(1), Jan. 1979, 002-9505/79/010029-06.

HUMAN AUDIBLE LOCALIZATION FOR SOUND EMITTING DEVICES

CROSS REFERENCE TO RELATED APPLICATION

This application is a continuation of U.S. patent application Ser. No. 13/214,354, entitled "Human Audible Localization for Sound Emitting Devices" filed on Aug. 22, 2011, which claims priority to U.S. Provisional Patent Application Ser. No. 61/449,356, entitled "Human Audible Localization for Sound Emitting Devices," filed on Mar. 4, 2011, the entire disclosures of which are incorporated by reference herein in their entirety.

FIELD OF THE INVENTION

The present invention generally relates to generating audible signals and more particularly to emitting human audible signals designed to aid in finding or locating the audio emitting device.

BACKGROUND OF THE INVENTION

Portable devices, such as handheld communications devices, such as car keys (including keys with fobs), cellular telephones, remote controls, and the like, are often misplaced. A device may be left in an unusual place or be covered by other objects, making it difficult to locate the device when the user wants to retrieve it. Many scenarios include a human attempting to locate a source of an audible signal. For example, locating misplaced portable devices, finding an exit in a smoke-filled building, guiding rescuers to an injured person, assisting in directing a visually impaired individual to find, for example, a direction in which to proceed to cross a street or find an exit, or any combination of these instances are cases where people use directional locations to a source of an audible signal.

Although various techniques are used to create audible signals as notifications, such as fire alarms, the frequency characteristics of these notification tones are often selected to most efficiently alert a human user, and not to aid in location of the device. Assisting a user in locating a source of audible signals is improved by generating audible signals that efficiently interact with physical human hearing mechanisms and psychoacoustic phenomena.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
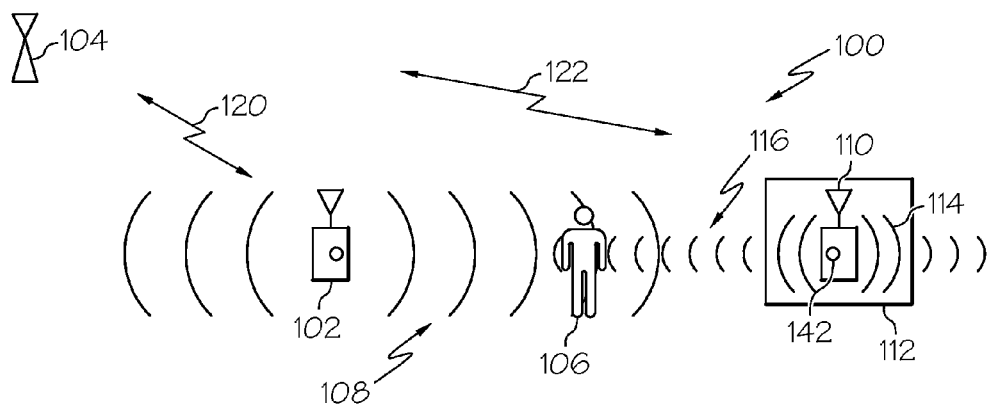
FIG. 1 illustrates an audio emitting device location scenario, in accordance with an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function. The term "substantially" as used herein describes a relationship between two values of a quantity such that changing the quantity between the two values does not result in a material change of relevant affects dependent upon the quantity.

The ability of a person to locate an unseen device is improved by emitting audible signals from the unseen device that better cooperate with physical human hearing mechanisms and psychoacoustic phenomena. A known characteristic of human hearing is that humans are most sensitive to a frequency range of between 1 kHz and 3 kHz, but in this same frequency band humans are also least able to discern the direction from which that sound originates. Studies have suggested that simply increasing the volume of a sound in this range does not help very much in discerning the direction.

Various physical structures of the human hearing mechanism result in greater directional perceptions for audible signals with frequencies at 500 Hz and below as well as for audible signals with frequencies above 4 kHz. Emitting audible signals within these bands of greater human directional sensitivity improves a person's ability to locate an unseen item. However, one or more of background noise, various audio propagation path distortions—such as multipath distortion caused by various sound paths between the device and the person's ear—are able to lessen the effectiveness of an emitted sound in helping a person locate an unseen device.

Described below are systems and methods to create and emit audible signals that provide a human user with improved sound localization cues to aid the human listener in more quickly and efficiently finding the device that is audibly emitting these created audible signals. These systems and methods incorporate principles of advanced psychoacoustics and perception of sound by humans to create emitted audible signals that aid a user in locating the source of the sound. These location-aiding audible signals are created in one example by applying specific audio signal elements to signal creation calculations that are performed by a signal generator, such as a dynamic audio Digital Signal Processor.

The location-aiding audible signals created by the described systems and methods are able to be emitted from equipment incorporated into a number of portable electronic devices, such as cellular phones, tablet computers, portable computers, car key fobs, electric pet license tags, television remote controls, and the like. These systems and methods are able to be incorporated into any device that could go missing, including large (not handheld) objects such as a car in a parking garage. In one application, a missing device receives a wireless signal, such as a cellular phone call, a short message service (SMS) message, an email, or any type of wireless signal by which a user indicates that the device is to make its presence device. In response to receiving that wireless signal, the device emits a series of defined location-aiding audible signals. These defined location-aiding audible signals are scientifically designed and selected based upon the physiology and physics of human hearing and other human psychoacoustic phenomenon to make the device easier to find by a human listener.

The location-aiding audible signals described below are able to be emitted by a large number of types of devices that benefit from emitting audible signals that a person is able to easily locate. Examples of various applications for emitters of the location-aiding audible signals are crosswalk beacons that emit an audible signal to assist vision impaired persons in determining which way they may cross a street. Further, a guide in a public place, such as a museum, is able to carry a device that emits location-aiding audible signals to assist vision impaired persons in following the guide through the place. The location-aiding audible signals are also able to be emitted in response to a trigger by a sensor, such as a fire or carbon monoxide sensor in order to provide increased awareness of the alarm and also aid in locating the triggering sensor if the sensor is near the sound emitter. Triggering the location Emitting the location-aiding audible signals is able to be triggered by various techniques, such as a wired or wireless trigger signal, a mechanical or other physical activation means that is part of the emitting device, or any other type of triggering mechanism.

The location-aiding audible signals are also able to be used in applications other than assisting in locating objects. The below described location-aiding audible signals exhibit audio characteristics that cause a human listener to have heightened awareness of these sounds. A listener's heightened awareness of the location-aiding audible signals is able to allow these audible signals to communicate context and importance. The location-aiding audible signals are able to provide psychoacoustic cues that are interpreted by a listener and used in context without requiring focus or special attention.

The systems and methods described below generate, emit, or both generate and emit one or more of three different types of location-aiding audible signals. These location-aiding audible signals are designed to efficiently assist a human in locating the source of the sound in three distinct scenarios. One location-aiding audible signal has been observed to efficiently help a human listener locate an audible origination point that is inside a sealed enclosure, such as a box, inside a refrigerator, or other container that does not have efficient acoustic venting. Another location-aiding audible signal has been observed to efficiently help a human locate an origination point of an audible signal that is in close proximity to the user. Yet another location-aiding audible signal has been observed to efficiently help a human locate an origination point of an audible signal that is a large distance from the user. In one application, activating the emission of these location-aiding audible signals results in a sequential emission of each of these three location-aiding audible signals.

The physiology and physics of human hearing and psychoacoustics phenomena that are involved in a human's locating the source of a sound being heard involve several principal elements. A first element is referred to as the Intra Level Differential (referred to as ILD), which is the difference in volume of the received sound that is heard by the left ear and the right ears. Another element is the Intra Time Differential (ITD), which is the difference in time between the same sound signal being heard by the left ear and the right ear. A third element is the Anatomical Transfer Function (ATF), which describes the way the human head, outer ear, and other structures alter sound by reflection and refraction within the ear and head to provide psychoacoustic cues for localization.

One effect that the below described location-aiding audible signals incorporate is that the various human systems have the lowest localization effectiveness for audible signals between 1 kHz and 3 kHz. The location-aiding audible signals emitted by the below described systems and methods do not generally explicitly incorporate tones in the 1 kHz to 3 kHz band to aid in locating the emitting device. Further, the energy spectrum in the frequency domain of noise or other broadband audible energy, such as pink noise, that may be incorporated into the location-aiding audible signals is generally not emphasized or otherwise altered in the 1 kHz to 3 kHz band.

The following are examples of the effects related to the physiology and physics of human hearing and psychoacoustics phenomena. The ILD element operates effectively to localize sound signals with frequencies above 3 kHz and does not operate efficiently at lower audio frequencies. The ITD element operates more effectively at lower audio frequencies. Humans have been observed to quite accurately locate the source of a pure tone at 500 Hz. The ITD element stops being effective around 1500 Hz. A human's ability to locate a source of sound based upon the ITD element has been observed to be enhanced by adding modulation to the sound signal, especially inter-modulation, causing the ITD to process the higher frequencies contained in the modulation and inter-modulation products. Hearing these higher audio frequencies significantly improve audible localization over longer distances.

The location-aiding audible signals emitted by the systems and method described below have several characteristics that address the above discussed elements. For example, these location-aiding audible signals avoid altering audible energy in the vicinity of 7 kHz, which is a frequency that the ATF element filters as being "directly overhead." Some of these location-aiding audible signals increase the spectral energy in the vicinity of 8 kHz because audible signals in that frequency range have been observed to provide extra ILD cues in reverberant environments. Some of these location-aiding audible signals use broadband audio signals because pure tones may be more difficult to locate via the ILD, ITD, and ATF elements.

These location-aiding audible signals are designed to have frequency and time domain characteristics that avoid the creation of standing waves. For example, generated frequencies are slightly rotated, or changed, during the audible signal creation process. In an example of creating a time series of audible signals, the generated frequency for some or all frequency components is rotated or changed so that the same spectral peak is not produced twice in a row for successive time intervals. Changing these created frequencies over time is able to reduce the presence of standing waves and may provide more accurate audible signal location processing by the listener. These location-aiding audible signals further provide multiple location cues to assist a user in locating the source of the emission when the user is able to control the motion of his or her head, such as by moving the head relative to a fixed device location, or vice versa.

The location-aiding audible signals leverage the "precedence effect," whereby first arriving tones are better noticed and processed for arrival time differences between the left ear and the right ear. In an example, the location-aiding signals contain frequent attacks, i.e., starting of different audible signals over time, instead of emitting continuous tones. Location-aiding signals with frequent attacks create a persistent localization image that survives additional reflection, reverberation, and the like. In one example, different signals with noticeably different spectral content are each separately emitted during separate, relatively short time durations. In an example, these different signals are each emitted during separate time durations that are approximately one-half of one second. The emission of these different audible signals are interleaved in time so that each signal is sequentially emitted for that short time duration, thereby creating an audio effect where the listener frequently hears a new "initial" sound such that the listener is frequently provided with directional queues.

In some examples, the user is able to activate a device's emission of location-aiding audible signals at a time when the user is unable to locate that device. Some devices, such as smart phones, allow a user to command the device to erase all data that is stored in the device. Issuing a remote command to a wireless device to erase all stored data is sometimes referred to as "remotely wiping" the device. A user may command the remote wiping of a device when the device is not able to be found. Prior to initiating the remote wiping of the device, however, the user is alternatively able to activate the emission of the location-aiding audible signals to help retrieve the device and avoid the potentially disruptive consequences of wiping the device's data.

FIG. 1 illustrates an audio emitting device location scenario 100, in accordance with an example. The audio emitting device location scenario 100 illustrates two examples of electronic devices that a user 106 is trying to locate. The first example shows a first electronic device 102 that is not within an enclosure. The second example shows a second electronic device 110 that is within an enclosure 112 that does not have effective acoustic venting. These two examples are described in further detail below.

In the first example, the first electronic device 102 is in a location not seen by the user 106, but is not within an enclosure. In various situations, the first electronic device 102 is in a location that is blocked from the view of the user 106 or the first electronic device was inadvertently covered by an object. The first electronic device 102 may not be seen by the user 106 for a wide variety of reasons at a time when the user 106 desires to quickly and efficiently locate the first electronic device.

In one example, the first electronic device is a wireless communications device. When the user 106 wants to locate the first electronic device 102, the first electronic device 102 starts to emit a location-aiding audible signal. Location-aiding audible signals can be emitted in response to a number of conditions. For example, a crosswalk audible "walk" signal may start in response to a traffic light change. Location-aiding audible signals may start to be emitted in case of an emergency, such as an injured person's notifying a rescuer, by a mechanical activation on the first electronic device 102, such as by a button press or breaking a part of the device. Further, emitting the location-aiding audible signal by the first electronic device 102 is able to be started in response to a user 106 initiating a transmission of a location-aiding audible signal activation signal, such as a first wireless signal 120, to the first electronic device 102. This location-aiding audible signal activation signal is able to be any signal that operates to trigger the emission of an audible location-aiding signal. Examples of the location-aiding audible signal activation signals, such as the first wireless signal 120, include a cellular phone call, a short message, an email, or any type of wireless signal that is received by the first electronic device 102. In the illustrated example, the wireless signal originates from a communications tower 104, such as a cellular phone or wireless data communications tower. In further examples, other transmitters are able to emit the wireless signal. The first wireless signal 120 is able to also be, for example, a short-range (e.g., 200 meters or less) wireless signal such as a Bluetooth® communications signal. Further examples are able to use optical, ultrasonic, or other signals as activation signals to trigger the emission of the location-aiding audible signals.

Once the first electronic device 102 receives the first wireless signal 120 or any other activation signal, a first set of location-aiding audible signals 108 is generated by an audio transducer 140 within the first electronic device 102. As described below, the electronic device 102 in one example emits two types of location-aiding audible signals to assist locating an electronic device that is not within an enclosure. A "near field" location-aiding audible signal is a type of emitted location-aiding audible signal that is designed to efficiently assist the user in locating the source of the audio signal emitted by a nearby audible signal generator or audio signal emitter that is near the user 106. A "far field" location-aiding audible signal is a type of location-aiding audible location signal that is designed to efficiently assist the user in locating the source of the audible signal emitted by a distant audible signal generator or audio signal emitter that is farther from the user 106. These two types of location-aiding audible signals are emitted in one example during separate time intervals in order to increase their effectiveness in their associated scenario. In further examples, an audible signal that simultaneously contains spectral characteristics of both of these two location-aiding audible signals is emitted.

In the second illustrated example, the second electronic device 110 is within an enclosure 112 that does not have effective acoustic venting. For example, the second electronic device 110 is able to have inadvertently been left in a refrigerator, a desk drawer, a briefcase, a computer case, or other enclosure. The enclosure may be, but need not be, airtight. While in the enclosure 112, the second electronic device is in a location not seen by the user 106. The acoustics within the enclosure 112 affects the sound generated by the second electronic device 110 and alters the sounds that propagate outside of the enclosure 112. Because the enclosure 112 does not have effective acoustic venting, sound propagates out of the enclosure 112 by transferring through walls of the enclosure 112 and not mainly by propagation through the air in vents of the enclosure 112.

When the user 106 wants to locate the second electronic device 110, the user triggers the emission of the location-aiding audible signal by any technique. In one example, the user 106 initiates the location-aiding audible signal by initiating a transmission of a second wireless signal 122 to the second electronic device 110. The second wireless signal 122 is similar to the first wireless signal 120 discussed above. In response to receiving the second wireless signal 122, the second electronic device 110 emits an enclosed device location-aiding audible signal 114. The enclosed device location-aiding audible signal 114 is affected by the acoustics within the enclosure 112 and is also attenuated as it exits the enclosure 112. An attenuated radiated audible signal 116 then radiates and propagates from the enclosure 112 to reach the user 106.

The first electronic device 102 and the second electronic device 110 in one example are configured to emit a sequence of all of the different location-aiding audible signals in response to receiving a location-aiding audible signal activation signal or in response to any activation. Each of the different location-aiding audible signals is designed to be effective in a particular scenario, one signal for an enclosed device, one signal for when the device is relatively near the user, and one signal for when the device is farther from the user. The first electronic device 102 and the second electronic device 110 emit a repeating sequence of all of the different location-aiding audible signals because the relative location of the device is not known when the activation signal is received. Because all of the location-aiding audible signals are emitted by the device in a repeating sequence, the device will, for a portion of the repeating sequence cycle, emit the signal that is most effective for the actual location of the device relative to the user.

Figure 2:
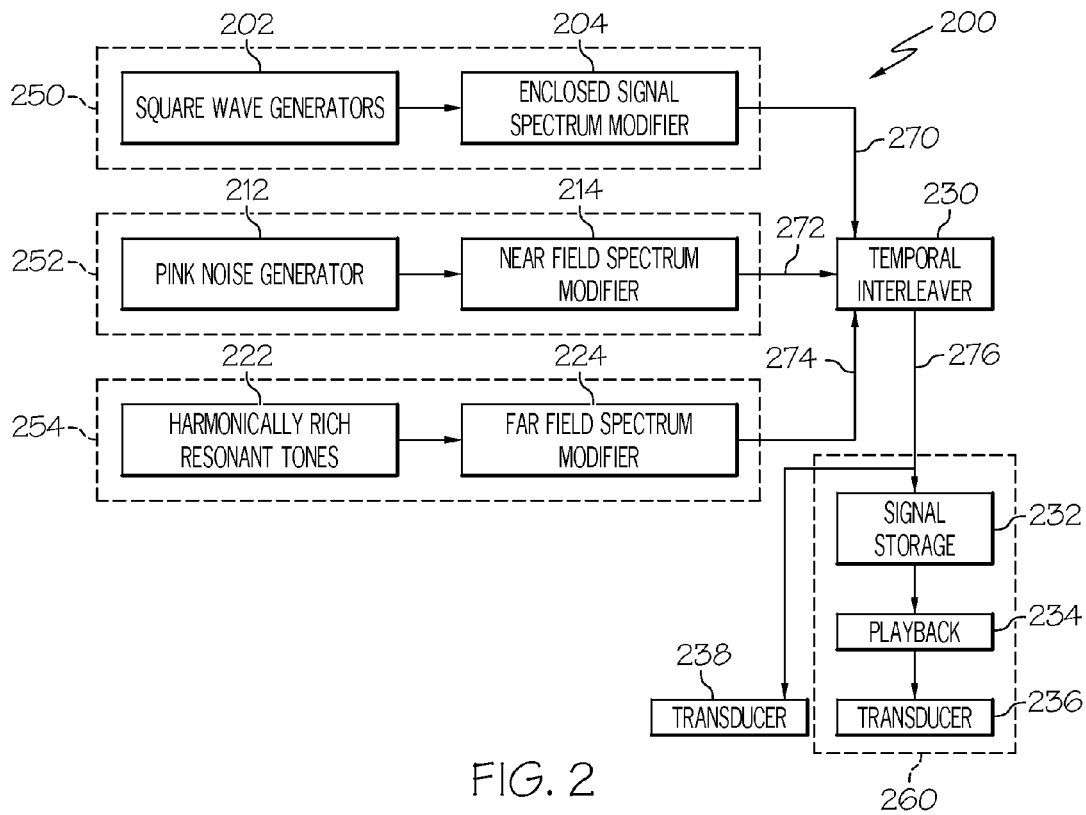
FIG. 2 illustrates a block diagram of a location-aiding audible signal creation device, according to one example.

FIG. 2 illustrates a block diagram of a location-aiding audible signal creation device 200, according to one example. The location-aiding audible signal creation device 200 includes three different location-aiding audible signal generators that are each combined to create a signal that is used to ultimately drive a transducer 236 to emit an audible signal to aid in finding the device that is emitting the audible signal. The location-aiding audible signal creation device 200 creates location-aiding audible signals by processing source audio signals that include audible tones, noise, or tones and noise. Further location-aiding audible signal creation devices are described below that create location-aiding audible signals by processing arbitrary audio signals, such as music recordings or other recorded, live, or concurrently generated audio sound sources. In one example, the location-aiding audible signal creation device 200 creates and stores a recording of a time-interleaved sequence of the three signals created by each of the location-aiding audible signal generators. This recording of the time-interleaved sequence is stored in an electronic device 260 to be audibly produced in response to receiving an activation signal, as is described above. In another example, the time-interleaved sequence of the three signals is provided as it is generated to a transducer 238 to be emitted immediately.

As described above, the location-aiding audible signals contain different component location-aiding audible signals that are each designed to be effective in a particular scenario. An enclosed location-aiding audible signal generator 250 creates an enclosed location-aiding audible signal 270 that is a component location-aiding audible signal used to produce a location-aiding audible signal that has been observed to be effective for finding a device that is within an enclosure. A near field location-aiding audible signal generator 252 creates a near field location-aiding audible signal 272 that is a component location-aiding audible signal that is used to produce a location-aiding audible signal that has been observed to be effective for finding a device that is relatively near the user. A far field location-aiding audible signal generator 254 creates a far field location-aiding audible signal 274 that is a component location-aiding audible signal that is used to produce a location-aiding audible signal that has been observed to be effective for finding a device that is farther from the user.

The enclosed location-aiding audible signal generator 250 creates an enclosed location-aiding audible signal 270 that is designed to effectively address the acoustics encountered when emitting audible signals from a device that is in an enclosure without effective audio venting. The acoustics of the enclosed space within an enclosure without effective audio venting distorts audible signals generated within that enclosure and alters the sound that propagates outside of the enclosure to the user. The enclosed field location-aiding audible signal 270 of one example includes a plurality of tone sets, wherein each tone set has a respective fundamental frequency and further includes harmonic tones related to the respective fundamental frequency, the amplitude of each tone within the plurality of tone sets being selected so as to cooperate with human hearing physiology and physics to aid in audible signal source location where the audible signal source is located within an enclosure without acoustic venting. The enclosed location-aiding audible signal generator 250 bases its created signal on a number of selected square wave audio signals generated by square wave generators 202. In one example, the square wave generators 202 generate a first square wave at 500 Hz, a second square wave at 588 Hz, and a third square wave at 930 Hz. These three square waves have relative peak power and RMS (root mean square) power values as are described below. The higher frequency harmonics that are contained in the additively mixed combination of these three square waves exhibit a dissonant tonal quality that creates psychological significance that differs from musicality. In contrast to the rhythmic nature of music, which tends to have tonal content that is pleasant with tonal content spaced at intervals selected according to traditional scales, the enclosed location-aiding audible signal 270 contains dissonant tonal combinations that create alerted awareness and psychological significance by being emitted with non-musical intervals that are outside of conventional music.

The square waves generated by the square wave generators 202 are then processed by an enclosed signal spectrum modifier 204. The enclosed signal spectrum modifier 204 in one example is a Digital Signal Processor (DSP) based processor that performs frequency domain processing to alter the amplitude of various frequency components produced by the square wave generators 202. In one example, the enclosed signal spectrum modifier 204 modifies the amplitude of various tones received from the square wave generator 202 such as by low pass filtering of a mixed combination of the three generated square waves. The enclosed signal spectrum modifier 204 is also able in some examples to process the received tones with defined non-linearities to generate inter-modulation products and harmonic components based upon the received tones.

In one example, the enclosed signal spectrum modifier 204 performs time pulsing of the signal so that the enclosed location-aiding audible signal 270 has an obvious on/off envelope, such as a substantially square time domain envelope equivalent to a square Attack, Decay, Sustain, and Release (ADSR) envelope. The intervals for the on/off envelope of the enclosed location-aiding audible signal 270 are selected to be different than intervals associated with music in order to alert the listener by way of creating psychological significance. In this example, the enclosed location-aiding audible signal 270 leverages the ITD psychoacoustic phenomena that are triggered by stacked pulsing tones that have an obvious on/off envelope that differs from pulsing intervals associated with music. In one example, the enclosed location-aiding audible signal 270 is gated on and off during a period in the sequence of signals, as is described below.

The near field location-aiding audible signal generator 252 creates a near field location-aiding audible signal 272 that is designed to effectively cooperate with the physiology and physics of human hearing to help a human locate and find an audible signal emitter that is relatively nearby. The near field location-aiding audible signal 272 of one example includes broad-bandwidth audible noise with spectral portions selectively modified so as to cooperate with human hearing physiology and physics to aid in audible signal source location. The near field location-aiding audible signal generator 252 bases its created near field location-aiding audible signal 272 on a pink noise audio signal that consists of substantially pink noise generated by a pink noise generator 212. Pink noise in this context refers to wide band-width audible noise that has a frequency spectrum with equal amounts of energy within each octave around audio frequency. Further examples are able to base the near field location-aiding audible signal 272 on white noise or other types of audible noise.

The pink noise audio signal generated by the pink noise generator 212 is then processed by a near field spectrum modifier 214. The near field spectrum modifier 214 in one example is a Digital Signal Processor (DSP) based processor that performs frequency domain processing to selectively modify spectral portions, such as the amplitudes of various frequency components, of the pink noise produced by the pink noise generator 212. In one example, the near field spectrum modifier 214 receives an input signal from the pink noise generator 212 that has an average spectral power of −20 decibels relative to Full Scale (dBFS) and selectively modifies spectral portions of the pink noise to create respective spectral amplitude peaks near certain audio frequencies by applying the following filtering and frequency selective amplification:

1) A high pass filter with a 3 db cutoff at 260 Hz and a 24 dB/octave rolloff, 2) a resonant bandpass filter centered at 500 Hz and amplifying the pink noise audio signal within its bandpass to have a peak spectral energy boost of +16 dB and with a "Q" factor of substantially 1/10 of an octave, 3) a resonant bandpass filter centered at 4 kHz and amplifying the pink noise audio signal within its bandpass to have a peak spectral energy boost of +20 dB and with a "Q" factor of substantially 1/10 of an octave, and 4) a resonant bandpass filter centered at 8 kHz and amplifying the pink noise audio signal within its bandpass to have a peak spectral energy boost of +16 dB and with a "Q" factor of substantially 1/10 of an octave.

The above described resonant bandpass filters provide spectral contouring of the pink noise audio signal received from the pink noise generator 212. In one example, the "Q" factor of the above filters is adjusted so that the bandpass filter at 500 Hz has a slightly wider, or numerically smaller, "Q" factor, and the bandpass filter at 4 kHz has a slightly more narrow, or numerically larger, "Q" factor.

The filtering performed by one example performs filtering that applies a resonant bandpass gain having specified peak gain values and specified "Q" values. The "Q" value of the bandpass gain in one example corresponds to a "Q" factor of a bandpass filter that has the specified center frequency and a bandwidth equal to that center frequency divided by the specified "Q" factor value. One example of a value for a "Q" factor of the bandpass filter is the ratio between the audio frequency of the peak energy output of the filter and the bandwidth of the one-half output power point of the filter. For example, a bandpass filter at 500 Hz with a "Q" factor of 1/10 has a one-half output power bandwidth of 50 Hz. In other words, the output power of this bandpass filter is one-half, or 3 dB below, the peak output power at 475 Hz and 525 Hz.

The term "full scale" in this description is a specification of a reference signal power level by which spectral components are measured. For example, specifying that a first signal is −14 dB relative to full scale and second signal is −16 dB relative to full scale indicates that the second signal has a power level that is 2 dB below the first signal. Specifying a number of signal components within a signal relative to a "full scale" value serves to only specify the relative values of these signal components to each other. Although the term "full scale" may refer to a maximum available audio signal power, the term "full scale" generally refers to a reference power level that is intended to be the highest power level available for signal generation. In one example, the audio signals are generated by a Digital Signal Processing (DSP) technique and a "full scale" level in some examples may be a maximum signal level that can be created using the signal representation of the particular DSP process. In this description, the term "full scale" is not related to an absolute value that may exist within abstractions of the DSP algorithms or implementations, or to absolute power levels within audio circuits themselves.

The far field location-aiding audible signal generator 254 creates a far field location-aiding audible signal 274 that is designed to effectively cooperate with the physiology and physics of human hearing to help a human locate and find an audible signal emitter that is relatively far from the human listener. The far field location-aiding audible signal 274 incorporates tonal and spectral characteristics that have been found to efficiently operate with human psychoacoustic effects to assist in locating the emitter of the far field location-aiding signal 274.

The far field location-aiding audible signal 274 of one example includes harmonically rich resonant tones with spectral component amplitudes selected so as to cooperate with human hearing physiology and physics to aid in audible signal source location. The harmonically rich resonant tones of one example include at least two of simultaneously occurring fundamental tone frequencies along with a number of respective harmonic components for each of the fundamental tone frequencies. The harmonically rich resonant tones of one example have spectral energy that is significant in the range of 3 khz to 10 khz. The efficacy of the harmonically rich resonant tones is generally dependent on constructive interference and inter-modulation that results in a constructive reinforcement of the fundamental and even-order harmonics. The generated harmonically rich resonant tones of one example are free of phase distortion and destructive or cancellation interference artifacts. The far field location-aiding audible signal generator 254 in one example bases its created far field location-aiding audible signal 274 on harmonically rich resonant tones that are produced by a harmonically rich resonant tone generator 222. Harmonically rich resonant tones are created by, for example, mechanical resonance created by striking a bell or ringer. In one example, harmonically rich resonant tones are based upon recording captured audio tones created by striking a bicycle bell at a rate of approximately 20 strikes per second. In one example, the initial audio signal is generated by metallic resonant instruments or high quality modeling synthesizer to achieve spectral data as you would with a standard bicycle bell with repeated hammer strikes, with approximately $\frac{1}{16}$ notes in the tempo range of 221. The initial audio signal in one example extends between 400 Hz and 12 kHz. Narrower or broader bandwidth initial audio signals are also able to be effectively used by different examples.

Further examples base harmonically rich resonant tones created by any creation process, such as mechanical striking of a metallic or other resonant object, synthesis of such tones through electronic techniques, and the like. In the above described example, an initial harmonically rich resonant tone set is captured and digitized by ringing a bicycle bell to create a tone set with one or more fundamental frequencies that are the principal or dominant tone frequencies of the generated tone sets. (The words "principal" and "dominant" or variations thereof are used herein in the sense of being important or foremost or peak, and are not necessarily being used in a musical sense.) This initially captured tone set is then electronically modified to create a harmonically related resonant tone set with any desired dominant tone frequency or sets of dominant tone frequencies by, for example, modifying the rate at which samples are reproduced or by other techniques.

The harmonically rich resonant tone generators 222 in one example generate an output audio signal that has very narrow bandwidth peaks in the vicinity of 2 kHz, 3.9 kHz, 4.2 kHz, 8 kHz, and 9 kHz. A tone with a frequency of 2 kHz is produced to assist a listener's far-field awareness as opposed to the human processing performed in near-field directional localization. The tones generated at the above listed five center frequencies have significantly higher energy than the energy of commonly encountered audible signals. In one example, the peak energy is equivalent to a +24 dB boost at a narrow bandwidth. In one example, the far field location-aiding audible signal includes a pair of tones with frequencies near 4 kHz, namely a tone at 3.9 kHz and a tone at 4.2 kHz. It has been empirically observed that this pair of tones operates to better assist in sound emitter localization as opposed to one tone at 4 kHz. One cause for this better localization assistance is that tones generated at this split frequency is much more resistant to destructive interference created by nodal cancellation than a single tone at 4 kHz. Empirical test indicate that the destructive interference is approximately 70% less for tones at this frequency pair than it is for a single tone at 4 kHz.

The harmonically rich resonant tones that are generated by a harmonically rich resonant tone generator 222 are then processed by a far field spectrum modifier 224. The far field spectrum modifier 224 in one example is a Digital Signal Processor (DSP) based processor that performs frequency domain processing to alter the amplitude of various frequency components produced by the harmonically rich resonant tone generator 222. The processing performed by the far field spectrum modifier 224 is described in further detail below.

The above audio signal generation, audible signal generation, and audio signal modification processing descriptions state example values for frequencies of tones or square waves, values of center frequencies for resonant bandwidths or spectral components, values of resonant bandwidth or "Q" factors for resonant bandwidths, and values of peak power of signal components or of amplification gain for a portion of the audio spectrum. It has been observed that effective location-aiding audible signals are able to have variations of up to about $\frac{1}{16}$ of an octave in one or more of the above listed center frequencies or frequencies of square waves or tones. In other words, systems are able to emit location-aiding audible signals with frequencies that are within about $\frac{1}{16}$ of an octave around the above listed frequencies and still effectively aid a human in locating the emitter.

It has also been observed that effective location-aiding audible signals are able to have variations of resonant bandwidths, or "Q" values, of up to about $\frac{1}{10}$ of an octave relative to the above listed values. For example, a location-aiding audible signal described above as having a portion of its spectrum amplified with a resonant having a "Q" factor of substantially $\frac{1}{10}$ of an octave is able to be realized by amplifying that portion of the spectrum with a resonant bandwidth of substantially $\frac{1}{9}$ of an octave to substantially $\frac{1}{11}$ of an octave.

It has been further observed that effective location-aiding audible signals are able to have variations of up to about ±3 dB for the above stated signal frequency component amplitude or boost or gain values for portions of the audio spectrum. Therefore, similarly effective location-aiding audible signals are able to have center frequencies that vary up to about $\frac{1}{16}$ of an octave within the above stated values, have resonant bandwidth or "Q" factor values that vary up to about $\frac{1}{10}$ of an octave, and have amplitudes of signal components or amplified spectral portions that vary up to about ±3 dB.

The enclosed location-aiding audible signal 270, the near field location-aiding audible signal 272 and the far field location-aiding audible signal 274 are combined in one example by a temporal interleaver 230 into a time-interleaved location-aiding audible signal 276. In this example, the time-interleaved location-aiding audible signal 276 causes each of these three signals to be separately emitted for a respective time duration with all of the different signals being interleaved in time. Emitting each location-aiding audible signal during separate times fully allows the designed characteristics of these different location-aiding audible signals to effectively interact with the physical structure and psychoacoustic phenomena of the human listener. Further, it has been observed that simultaneously emitting two or more of these location-aiding audible signals may cause distortions through constructive and destructive combining of the signals, thereby affecting the efficiency with which those location-aiding audible signals interact with the physical structure and psychoacoustics of the human listener.

The time-interleaved audible signals 276 produced by the temporal interleaver 230 are stored into a signal storage 232. Signal storage 232 is able to be any type of digital or analog storage device that stores a definition of a audio signal representation of an audible signal that is to be later reproduced. In one example, the signal storage is a non-volatile digital data storage memory device. The data stored within the signal storage 232 is also able to be encoded by various techniques, such as encoding techniques used to reduce the amount of data that is required to be stored to reproduce the desired signal.

In one example, an electronic device 260 is produced that includes the signal storage 232 along with a playback circuit 234 and audio transducer 236. In this example, the signal generators of the location-aiding audible signal creation device 200 are used by a developer to create a time-interleaved audible signal 276 and the developer stores a representation of the time-interleaved audible signal 276 into the signal storage 232. The contents of the signal storage 232, including the time-interleaved audible signals 276, are duplicated and a copy is placed in each electronic device 260 that is to emit the location-aiding audible signal. As an alternative to storing the time-interleaved location-aiding audible signal in a signal storage 232, an electronic device is able to include the signal generators and provide the time-interleaved audible signal 276 directly to a local audio transducer 238.

Figure 3:
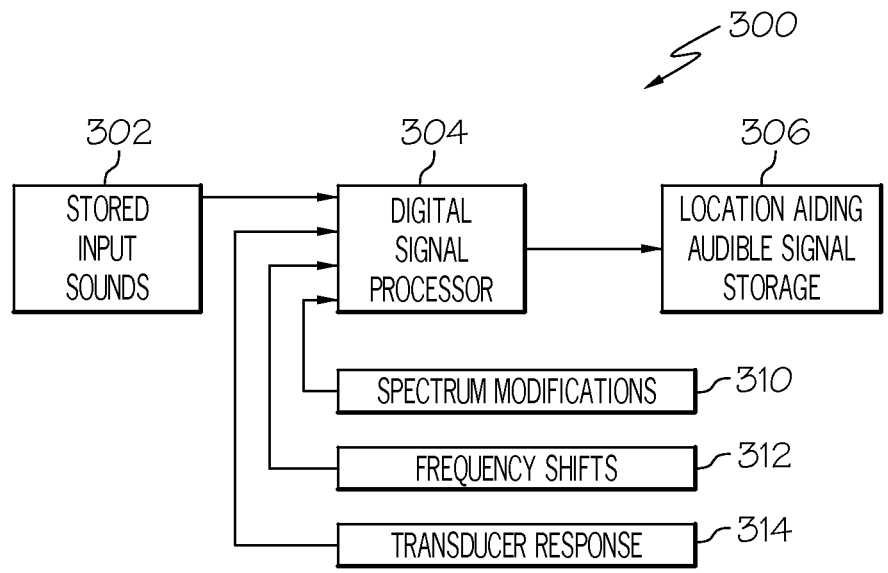
FIG. 3 illustrates a signal spectrum modifier, in accordance with one example.

FIG. 3 illustrates a signal spectrum modifier 300, in accordance with one example. The signal spectrum modifier 300 is an example of a Digital Signal Processor based processing structure that is able to be used to implement, for example, all or part of one or more of the enclosed location-aiding audible signal generator 250, the near field location-aiding audible signal generator 252 and the far field location-aiding audible signal generator 254. In various examples, the signal spectrum modifier 300 is implemented in a programmable digital signal processing circuit that is able to incorporate one or more of general purpose programmable processors, special purpose programmable processors, and dedicated digital signal processing circuits. In further examples, the signal generators are able to be generated by any processing structure that creates or defines an audible signal that has the location-aiding characteristics described herein.

The signal spectrum modifier 300 operates on audio signals stored in a stored input sounds storage 302. In general, signals stored in the stored input sounds storage 302 are digital or analog recordings of either captured audio or audio created by various computer programs, synthesis systems, or through other techniques. The signals stored in the stored input sounds storage 302 are able to be stored in an analog format, a direct digitization format, or an encoded format that, for example, reduces the amount of data that is stored to represent an audible signal. With reference to the above signal generators, the stored input sounds storage 302 is able to store definitions of pink noise and selected tones. In further examples, alternative signal spectrum modifiers are able to operate on input audio signals that are generated, such as by square wave generators, pink noise generators, and the like, and those generated audio signals are then processed by a digital signal processor 304 or the like. Further examples are able to process audio signals are concurrently captured, such as by a microphone or an audio signal communications apparatus, to produce location-aiding audible signals.

The signals stored in the stored input sounds 302 are provided in one example to a digital signal processor 304. The digital signal processor uses various algorithms to modify or alter the audio signal stored in the stored input sounds 302. In one example, the digital signal processor 304 receives a specification of spectrum modifications 310 and a specification of frequency shifts 312. The specification of spectrum modifications 310 specifies, for example, contouring of the frequency spectrum of the signals received from the stored input sounds 302. The contouring specified in the spectrum modifications include, for example a specified "Q" of a resonant amplified filtering of a portion of the frequency spectrum of the signal received from the stored input sounds 302. Further specifications within the spectrum modifications 310 include frequency selective amplification to create pink noise, such as a pink noise amplitude roll-off to be applied to the signals received from the stored input sounds 302.

The Digital Signal Processor 304 also receives specifications of frequency shifts 312 to control the modification of the signal received from the stored input sounds 302. An example of an application that uses specifications frequency shifts includes a stored input sounds 302 that stores an audio signal with a single predominant tone, or fundamental frequency, and various harmonics that is to be shifted in frequency to another predominant tone or fundamental frequency. For example, the stored input sounds may store an audio signal that consists of harmonically rich resonant tones, such as are generated by a metal bell, with a predominant frequency of 1 kHz. The frequency shifts 312 may specify that this signal is to be shifted to have a predominant frequency of 3 kHz.

The frequency shifts 312 are also able to specify a number of frequency shifts whereby the signal received from the stored input sounds 302 is copied and each copy is shifted by a different amount so as to have different predominant frequencies. Separate amplitudes or attenuations for each of these copies are also able to be specified. For example, the frequency shifts 312 is able to specify that a signal received from the stored input sounds 302 with a predominant frequency of 1 kHz is to be copied and shifted to have predominant frequencies of 3.9 kHz, 4.2 kHz, 7 kHz and 8 kHz. The copy shifted to having a predominant frequency of 3.9 kHz is also specified to be attenuated by 3 dB relative to the signal received, the copy shifted to having a predominant frequency of 4.2 kHz is also specified to be attenuated by 3.5 dB relative to the signal received, the copy shifted to having a predominant frequency of 7 kHz is also specified to be attenuated by 6 dB relative to the signal received, and the copy shifted to having a predominant frequency of 8 kHz is also specified to be attenuated by 7.5 dB relative to the signal received.

The Digital Signal Processor 304 also receives specifications of transducer response 314. The transducer response 314 contains information regarding the frequency response, and in some examples the phase response, of the transducer that will emit the audible signals produced by the Digital Signal Processor 304. In various devices, the audible signals are emitted by a transducer, such as transducer 236 discussed above, that has varying output levels with respect to audio frequency. For example, a small transceiver may have a frequency response peak in the vicinity of 3 kHz and attenuate emitted audible signals with frequencies that are removed from that frequency. In order to preserve the intended audio frequency energy spectrum of the emitted audible location-aiding signals, the signal generator compensates the generated signal by providing, for example, frequency selective amplification to compensate for the frequency selective attenuation of the transducer.

Figure 4:
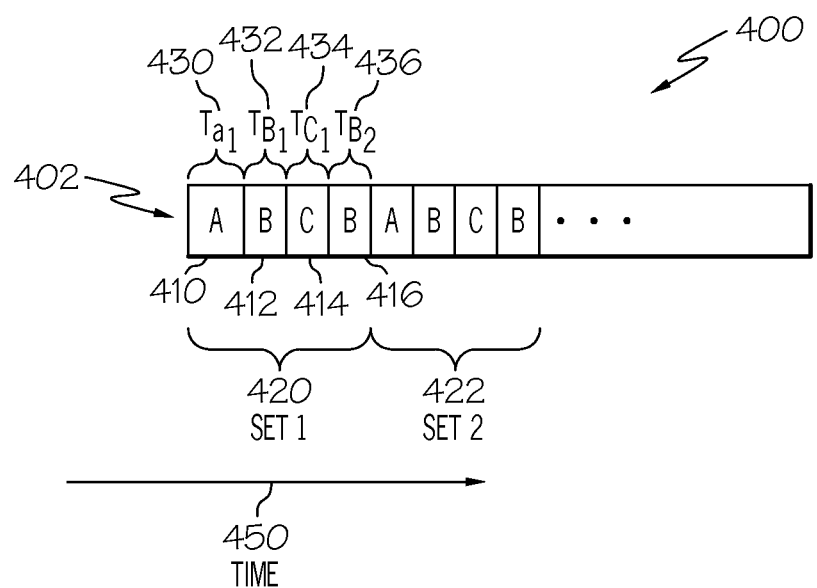
FIG. 4 illustrates a time interleaved location-aiding audible signal timeline, in accordance with one example.

FIG. 4 illustrates a time-interleaved location-aiding audible signal timeline 400, in accordance with one example. The time-interleaved location-aiding audible signal timeline 400 depicts the time interleaving of different component location-aiding audible signals as emitted by one example. The time-interleaved location-aiding audible signal timeline 400 illustrates a time axis 450 that shows time progressing to the right of the diagram. A signal time profile 402 depicts a sequence of different component location-aiding audible signals that are emitted by a device during successive time durations, as is described in detail below.

A first set of signals 420 is shown to begin with a location-aiding audible signal A 410 that is emitted during a first time duration $T_{A1}$ 430. The location-aiding audible signal A 410 is followed in time by a location-aiding audible signal B 412 that is emitted during a second time duration $T_{B1}$ 432. The location-aiding audible signal B 412 is followed in time by a location-aiding audible signal C 414 that is emitted during a third time duration $T_{C1}$ 434. The location-aiding audible signal C 414 is followed by a second burst of location-aiding audible signal B 416 that is emitted during a fourth time duration $T_{B2}$ 436. In this example, the second burst of location-aiding audible signal B 416 is a copy of the location-aiding audible signal B 412. After the first set of signals 420, a second set of signals 422 is emitted that has the same structure as the first set of signals 420 in this example.

The location-aiding audible signal A 410 in one example is an enclosed location-aiding audible signal 270 with the characteristics described above and a spectral content as is described below. The location-aiding audible signal B 412 in one example is a near field location-aiding audible signal 272 with the characteristics described above and a spectral content as is described below. The location-aiding audible signal C 414 is a far field location-aiding audible signal 274 with the characteristics described above and the spectral content as is also described below.

In the illustrated example, these different component location-aiding audible signals are emitted sequentially without any intervening periods or time durations (such as periods of quiet, with no substantial audible signals being emitted). Further examples are able to emit a sequence of component location-aiding audible signals with quiet periods between emitting each different signal or with quiet periods between emitting particular component location-aiding audible signals. In various examples, the three different component location-aiding audible signals are generated and emitted with substantially equal RMS power levels or with differing power levels.

In one example, each component location-aiding audible signal is emitted for substantially uniform time durations. In an example, these component signals are each emitted for one-half second. Further examples are able to emit various component location-aiding audible signals for different time durations and are also able to vary the time duration during different iterations of the set of signals. In various examples, the sequence of component location-aiding audible signals results in generating pulsing sound attacks of the sound signals being heard by a person. These pulsing sound attacks serve several purposes: 1) to emphasize IDT cues; 2) to reduce adaptation that occurs with constant signals being heard by the person; and 3) to tune perceptual sensitivity to the specific localization frequencies. The continual sequence of component location-aiding audible signals that is generated in one example, which is generated without a "quiet period" between the different signals, provides individual on-off perception due to the changing character of the sound heard by the person when the different component location-aiding audible signals change. In one example, there is actually a continuous RMS output energy heard by the person. In this example, however, although the output signal has a continuous energy level, the precedence effect cues are produced due to the perceived change via a sequence of the three different component location-aiding audible signals. In the case of a sequence that is generated without quiet periods between the different location-aiding audible signals, the change between these three different signals with significantly different spectral content triggers localization cues more efficiently, quickly, and accurately than a sequence that reduces the energy of the emitted sound between the various location-aiding audible signals, such as would occur if "quiet periods" were inserted between the different signals.

Figure 5:
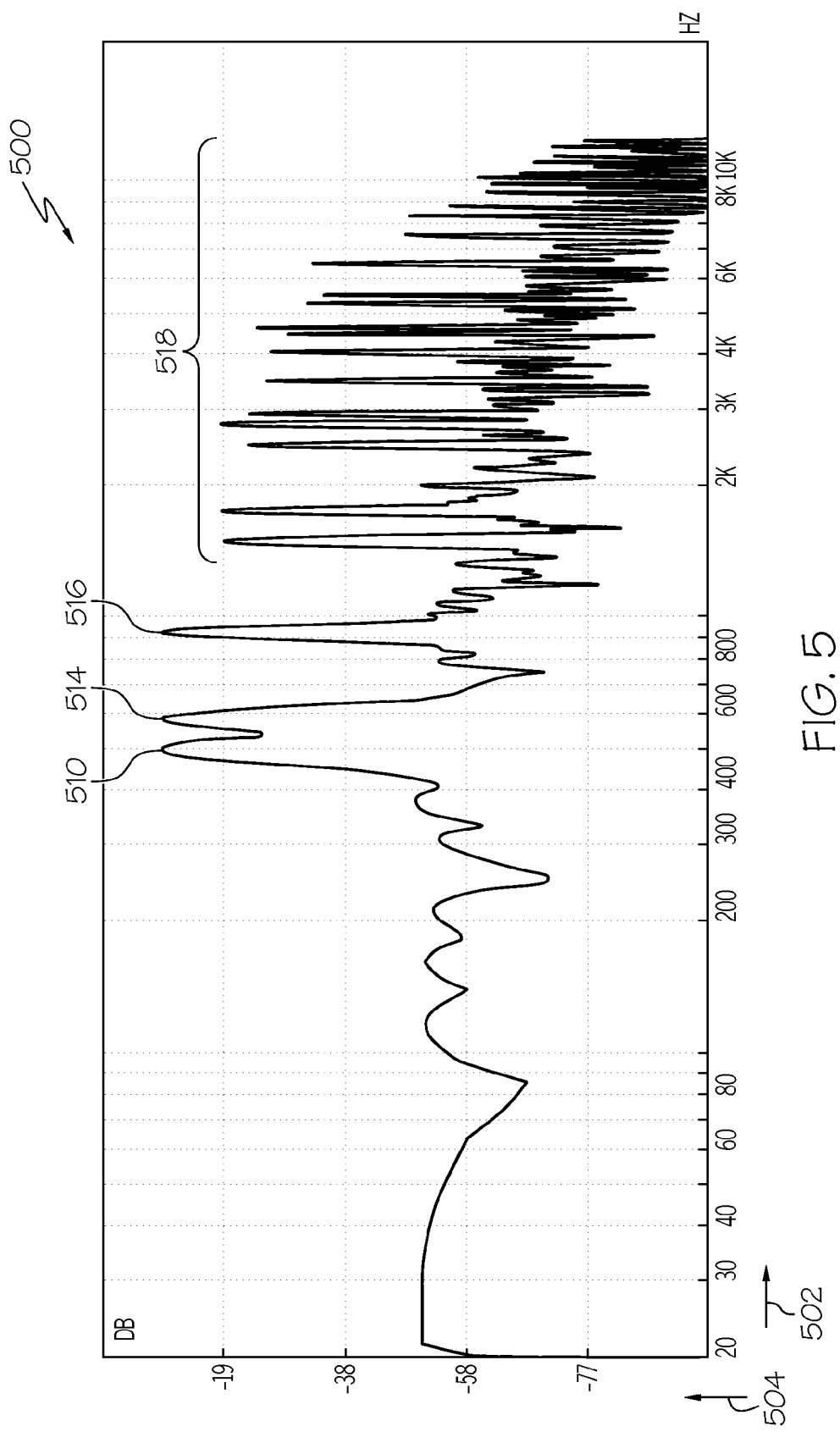
FIG. 5 illustrates an enclosed location-aiding audible signal spectrum, according to one example.

FIG. 5 illustrates an enclosed location-aiding audible signal spectrum 500, according to one example. The enclosed location-aiding audible signal spectrum 500 is a frequency domain representation of one example of the enclosed location-aiding audible signal 270 described above. The enclosed location-aiding audible signal spectrum 500 is depicted with a horizontal frequency scale 502 and a vertical power scale 504. The top of the enclosed location-aiding audible signal spectrum 500 represents a 0 dB power reference with negative power levels depicted below that top line, as represented on the vertical power scale 504.

The enclosed location-aiding audible signal spectrum 500 depicts a 500 Hz tone 510 that is a fundamental tone frequency of an initial 500 Hz square wave that has a peak level of −9.4 dB relative to full scale and an RMS level of −14 dBm. A depicted 588 Hz tone 514 is a fundamental tone frequency of an initial 588 Hz square wave that has a peak level of −10 dB relative to full scale and an RMS level of −14 dBm. A depicted 930 Hz tone 516 is a fundamental tone frequency of an initial 930 Hz square wave that has a peak level of −11 dB relative to full scale and an RMS level of −16 dBm. These initial square waves are additively mixed and processed by a low pass filter with a 5 kHz 3 dB cutoff frequency and a rolloff of 24 dB per octave. The output of the low pass filter is then compensated to achieve an output level for the composite signal of 0 dB relative to full scale with an RMS level of −7 dB. The enclosed location-aiding audible signal spectrum 500 further shows additional harmonic tones and inter-modulation products 518 that result from the mixing of these square waves and the specified filtering also depicted to create the numerous tones of the enclosed location-aiding audible signal spectrum 500.

Figure 6:
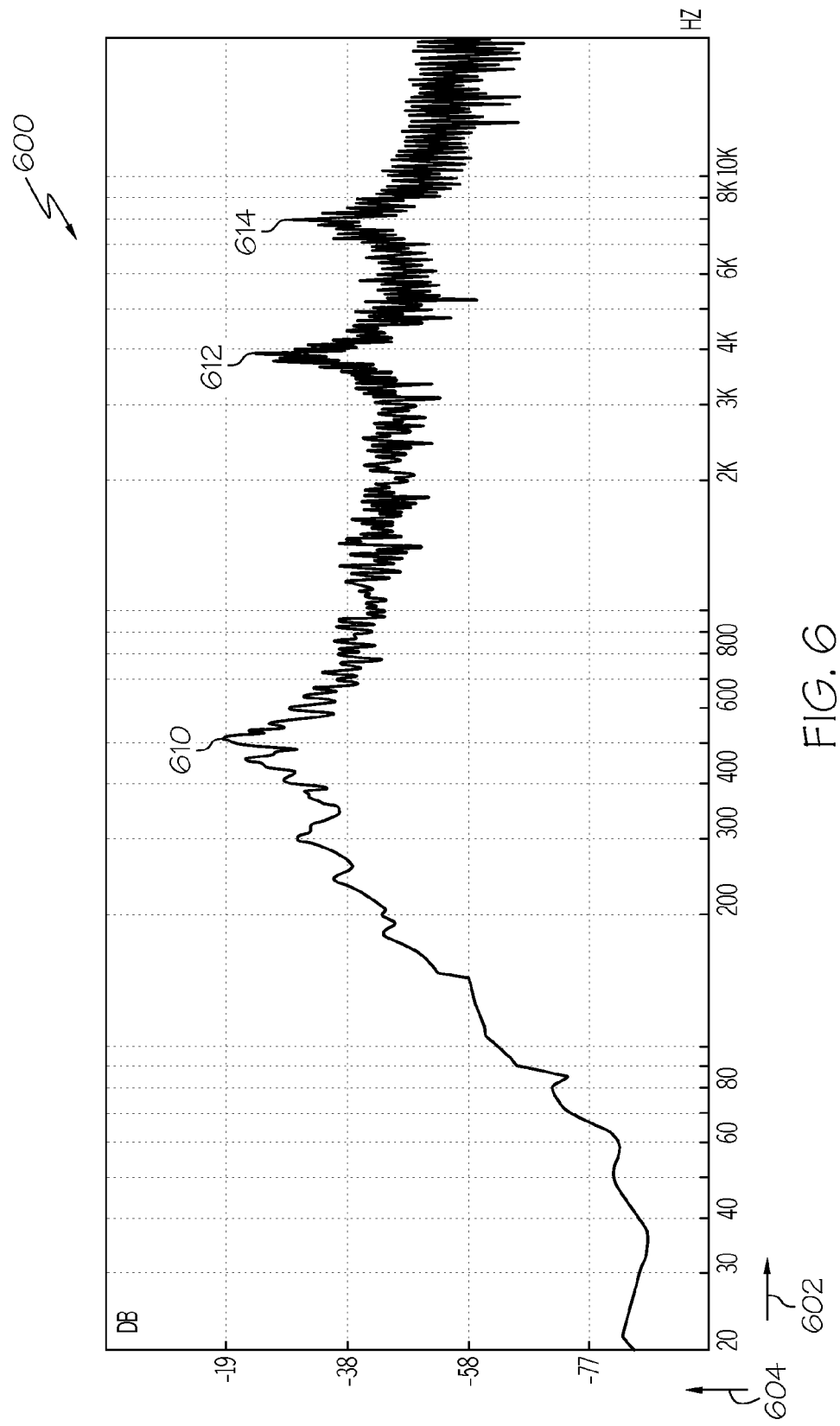
FIG. 6 illustrates a near field location-aiding audible signal spectrum, according to one example.

FIG. 6 illustrates a near field location-aiding audible signal spectrum 600, according to one example. The near field location-aiding audible signal spectrum 600 is a frequency domain representation of one example of the near field location-aiding audible signal 272 described above. The near field location-aiding audible signal spectrum 600 is depicted with a horizontal frequency scale 602 and a vertical power scale 604. The top of the near field location-aiding audible signal spectrum 600 represents a 0 dB power reference with negative power levels depicted below that top line, as represented on the vertical power scale 604.

As described above, the near field location-aiding audible signal 272 is created by contouring a pink noise audio signal to create a pink noise spectrum that has several relatively narrow bands of higher energy content. The near field location-aiding audible signal spectrum 600 depicts a first bandwidth 610 that is centered at 500 Hz, a second bandwidth 612 with a center around 4 kHz and a third bandwidth 614 with a center around 8 kHz. As described above, the energy in these bandwidths is created by contouring a pink noise audio signal with respective resonant band pass filters with a "Q" factor of about $\frac{1}{10}$ of one octave to amplify the noise energy within the bandwidth of those filters. In one example, the "Q" factor of the above filters is adjusted so that the bandpass filter at 500 Hz has a slightly wider "Q" factor, and the bandpass filter at 4 kHz has a slightly more narrow "Q" factor. The energy of the bandpass filters at 500 Hz and 8 kHz are configured to have peak gains of +16 dB and the bandpass filter at 4 kHz is configured to have a peak gain of +20 dB.

The vertical components of the frequency spectra illustrated in the near field location-aiding audible signal spectrum 600 represent energy per unit bandwidth. The energy contained within the second bandwidth 612 and the third bandwidth 614 is spread over a greater bandwidth because the bandwidth of those filters is a particular fraction of the filter's center frequency. This greater spreading of energy within these higher center frequency filters results in a lower illustrated peak for these filters. However, as described above, the first bandwidth 610 and the third bandwidth 614 have total energy content of +16 dB over an equal bandwidth of the surrounding pink noise level and the second bandwidth 612 has a total energy content of +20 dB over an equal bandwidth of the surrounding pink noise level.

Figure 7:
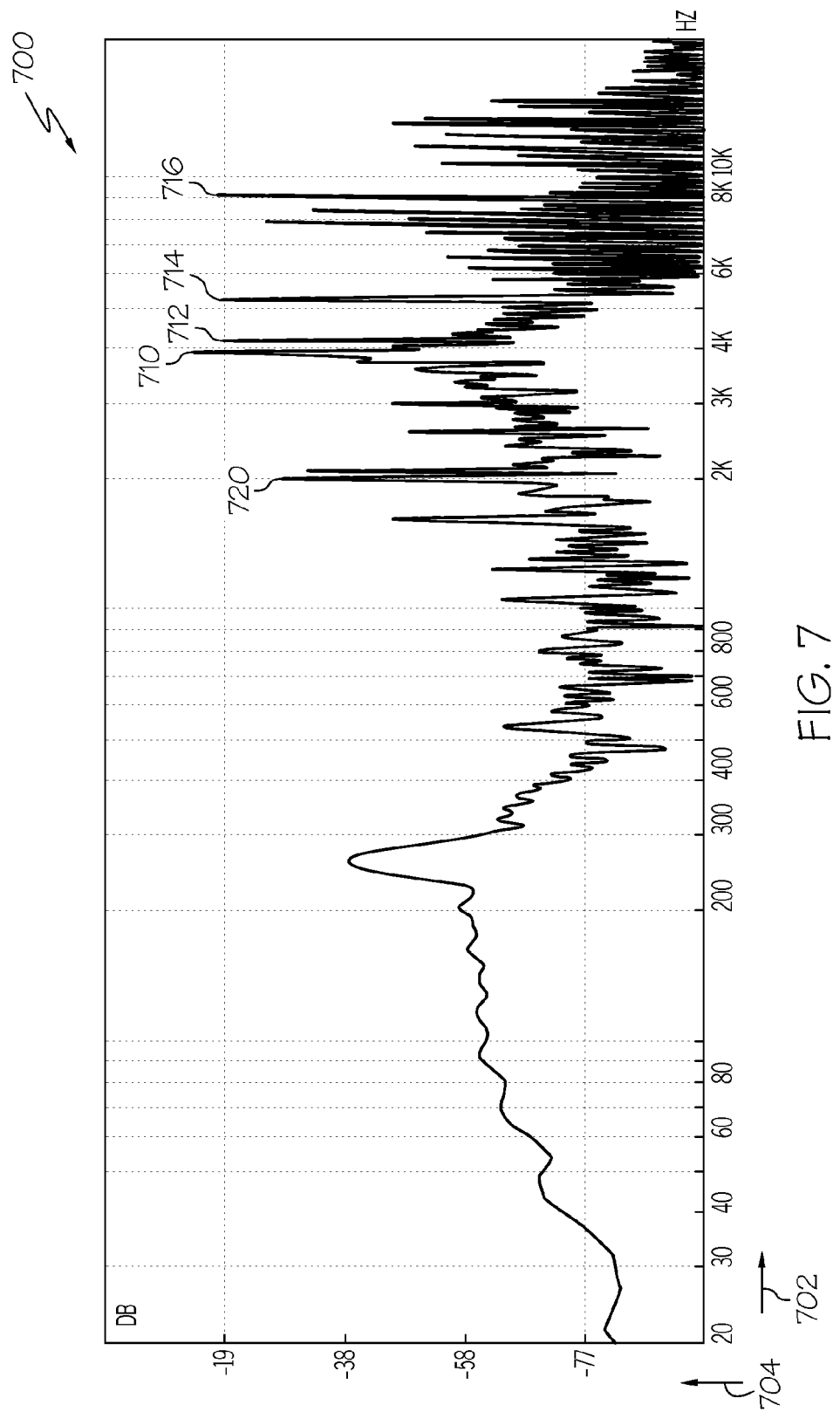
FIG. 7 illustrates a far field location-aiding audible signal spectrum, according to one example.

FIG. 7 illustrates a far field location-aiding audible signal spectrum 700, according to one example. The far field location-aiding audible signal spectrum 700 is a frequency domain representation of one example of the far field location-aiding audible signal 274 described above. The far field location-aiding audible signal spectrum 700 is depicted with a horizontal frequency scale 702 and a vertical power scale 704. The top of the far field location-aiding audible signal spectrum 700 represents a 0 dB power reference with negative power levels depicted below that top line, as represented on the vertical power scale 704.

The far field location-aiding audible signal spectrum 700 depicts a 2 kHz tone 720, a 3.9 kHz tone 710, a 4.2 kHz tone 712, an 8 kHz tone 714, and a 9 kHz tone 716. In one example, the far field location-aiding audible signal spectrum 700 contains spectral components extending between 400 Hz and 12 kHz. The far field location-aiding audible signal spectrum 700 also depicts the harmonics and intermodulation products that are created either by intentional non-linear distortions or by the process from which the tones are captured, such as by capturing a harmonically rich sound from a bell. The far field location-aiding audible signal spectrum 700 depicts a 2 kHz tone 720 that is present to assist with a human's far-field awareness as opposed to near-field directional localization.

Figure 8:
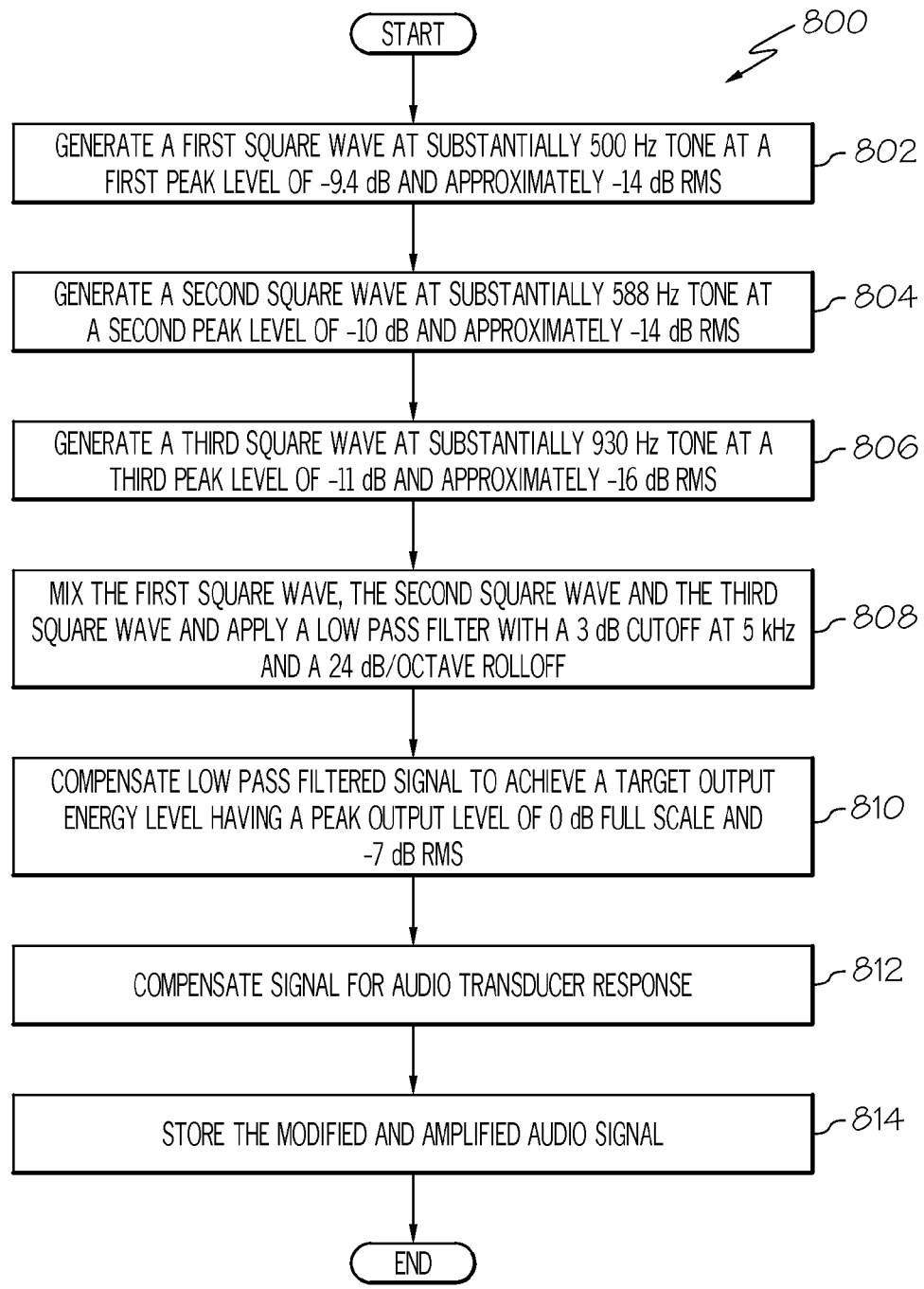
FIG. 8 illustrates a generate enclosed location-aiding audible signal generation process, according to one example.

FIG. 8 illustrates a generate enclosed location-aiding audible signal generation process 800, according to one example. The enclosed location-aiding audible signal generation process 800 begins by generating, at 802, a first square wave at substantially 500 Hz tone at a first peak level of −9.4 dB and approximately −14 dB RMS. The enclosed location-aiding audible signal generation process 800 continues by generating, at 804, a second square wave at substantially 588 Hz tone at a second peak level of −10 dB and approximately −14 dB RMS and generating, at 806, a third square wave at substantially 930 Hz tone at a third peak level of −11 dB and approximately −16 dB RMS. The first square wave, the second square wave and the third square wave are then additively mixed a low pass filter is applied, at 808. The low pass filter of one example has a 3 dB cutoff at 5 KHz and a 24 dB/octave rolloff. The low pass filtered audio signal is compensated, at 810, to achieve a target output energy level having a peak output level of 0 dB Full Scale and −7 dB RMS. The above defined combination of three square waves with the specified power level relationships and the above described power filtering and compensation creates the enclosed location-aiding audible signal spectrum 500, described above.

The enclosed location-aiding audible signal generation process 800 in one example compensates, at 812, the audio signal for the audio transducer response of the particular device that will emit the created enclosed location-aiding audible signal. In several examples, a transducer is used to emit the enclosed location-aiding audible signal. The transducer may have a variation in input signal to output sound response over the frequency range of the enclosed location-aiding audible signal. In order to preserve the desired spectral content of the produced enclosed location-aiding audible signal, some examples perform a frequency domain compensation to cause the generated enclosed location-aiding audible signal to be essentially pre-distorted to compensate for the distortion to be introduced by the transceiver and possibly by the recording process, reproduction electronics, or other components. The enclosed location-aiding audible signal generation process 800 continues by storing, at 814, the modified and amplified audible signal. The process then ends.

Figure 9:
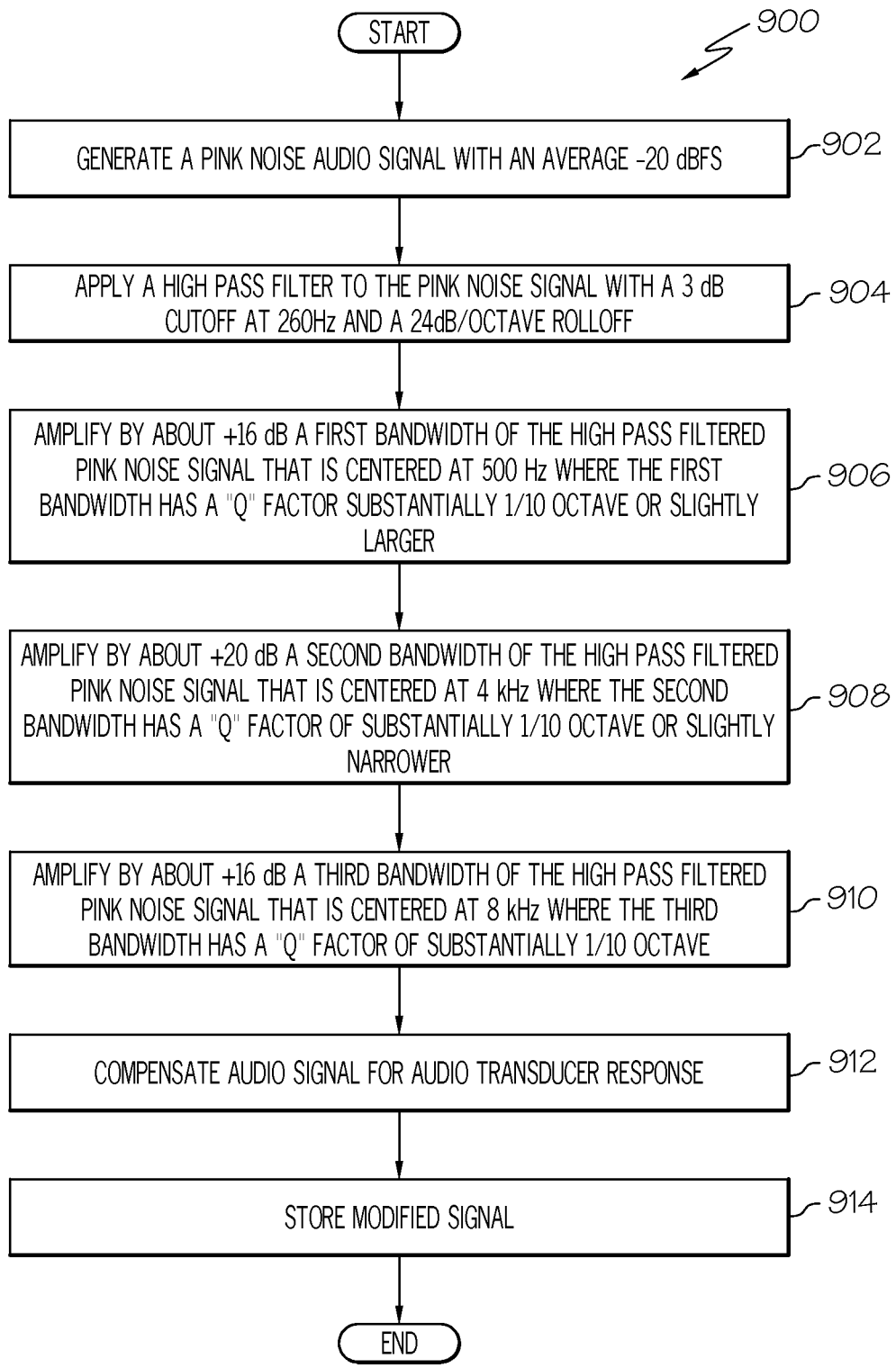
FIG. 9 illustrates a generate near field location-aiding audible signal generation process, according to one example.

FIG. 9 illustrates a generate near field location-aiding audible signal generation process 900, according to one example. The generate near field location-aiding audible signal generation process 900 begins by generating, at 902, a pink noise audio signal with an average −20 dBFS of spectral energy. The generate near field location-aiding audible signal generation process 900 continues by applying, at 904, a high pass filter to the pink noise signal with a 3 dB cutoff at 260 Hz and a 24 dB/octave rolloff.

The generate near field location-aiding audible signal generation process 900 continues by amplifying, at 906, by about +16 dB a first bandwidth of the high pass filtered pink noise signal that is centered at 500 Hz. In one example, the first bandwidth has a "Q" factor substantially $\frac{1}{10}$ octave or slightly larger. The generate near field location-aiding audible signal generation process 900 continues by amplifying, at 908, by about +20 dB a second bandwidth of the high pass filtered pink noise signal that is centered at 4 kHz. In one example, the second bandwidth has a "Q" factor of substantially $\frac{1}{10}$ octave or slightly narrower. The generate near field location-aiding audible signal generation process 900 continues by amplifying, at 910, by about +16 dB a third bandwidth of the high pass filtered pink noise signal that is centered at 8 kHz. In one example, the third bandwidth has a "Q" factor of substantially $\frac{1}{10}$ octave.

As described above, some examples compensate, at 912, the generated signal for the response of the audio transducer in order to ensure that the emitted generate near field location-aiding audible signal has the desired spectral content. This compensation is not generally required. The generate near field location-aiding audible signal generation process 900 then stores, at 914, the modified signal.

Figure 10:
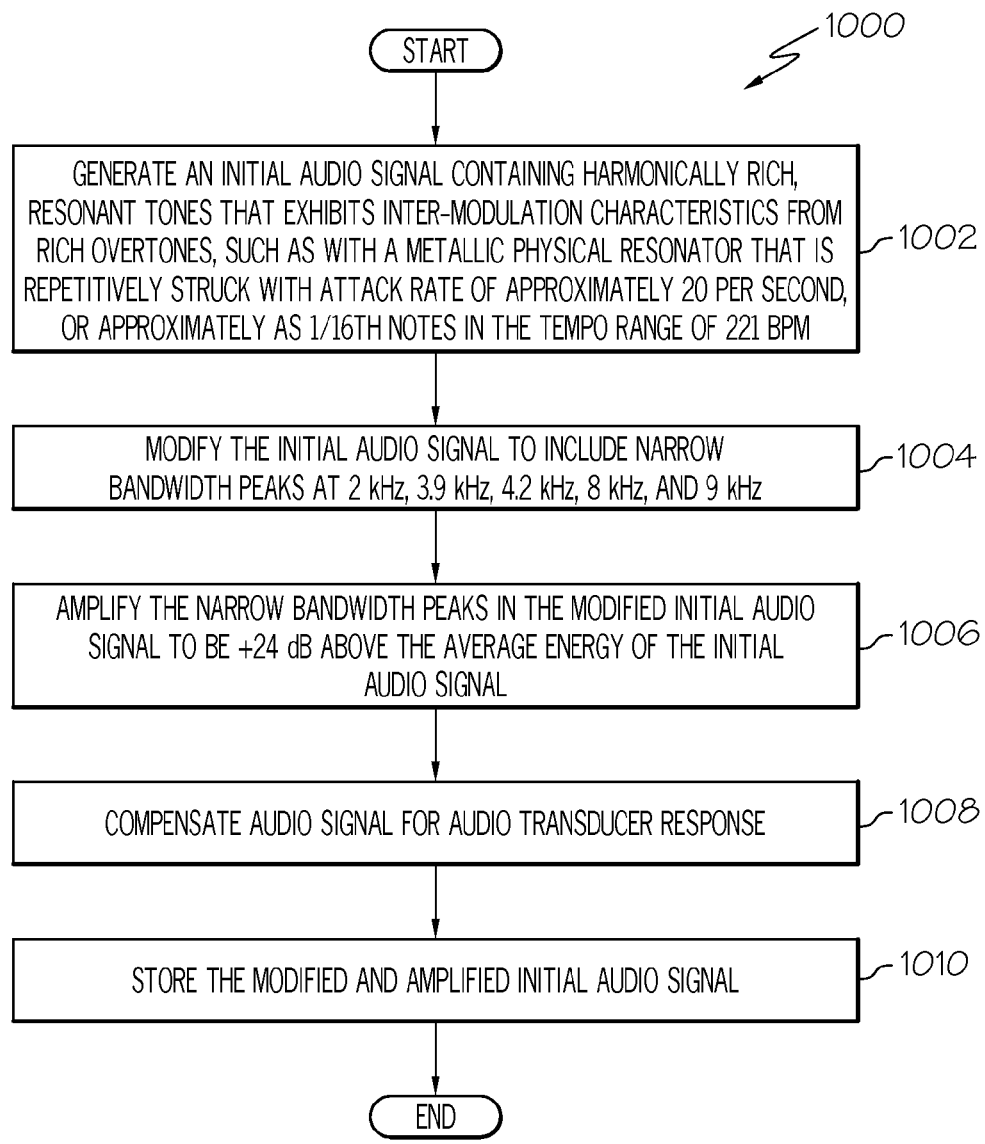
FIG. 10 illustrates a generate far field location-aiding audible signal generation process, according to one example.

FIG. 10 illustrates a generate far field location-aiding audible signal generation process 1000, according to one example. The generate far field location-aiding audible signal generation process 1000 begins by generating, at 1002, an initial audio signal containing harmonically rich, resonant tones that exhibits inter-modulation characteristics from rich overtones, such as with a metallic physical resonator that is repetitively struck with attack rate of approximately 20 per second. In one example, the initial audio signal is generated by metallic resonant instruments or high quality modeling synthesizer to achieve spectral data as you would with a standard bicycle bell with repeated hammer strikes, with approximately 1/16 notes in the tempo range of 221. The initial audio signal in one example extends between 400 Hz and 12 kHz. Narrower or broader bandwidth initial audio signals are also able to be used by different examples.

The generate far field location-aiding audible signal generation process 1000 continues by modifying, at 1004, the initial audio signal to include narrow bandwidth peaks at 2 kHz, 3.9 kHz, 4.2 kHz, 8 kHz, and 9 kHz. The generate far field location-aiding audible signal generation process 1000 proceeds to amplify, at 1006, the narrow bandwidth peaks in the modified initial audio signal to be +24 dB above the average energy of the initial audio signal. This amplification is performed in some examples by a digital signal processor. In some examples, as described above, the generate far field location-aiding audible signal generation process 1000, at 1008, compensates signal for the audio transducer response. The generate far field location-aiding audible signal generation process 1000 then stores, at 1010, the modified and amplified initial audio signal.

As discussed above, effective location-aiding audible signals are able to have variations from the example values stated in the above signal generation process descriptions. For example, effective location-aiding audible signals can have variations in the values of the above listed center frequencies or frequencies of square waves or tones of up to about 1/16 of an octave. Effective location-aiding audible signals are able to have variations of resonant bandwidths, or "Q" values, of up to about 1/10 of an octave and variations of up to about ±3 dB for the above stated signal frequency component amplitude or boost or gain values for portions of the audio spectrum. Therefore, similarly effective location-aiding audible signals are able to be created by processes that use center frequencies that vary up to about 1/16 of an octave from the above stated values, that use resonant bandwidth or "Q" factor values that vary up to about 1/10 of an octave, and that use amplitudes of signal components or amplified spectral portions that vary up to about ±3 dB.

Figure 11:
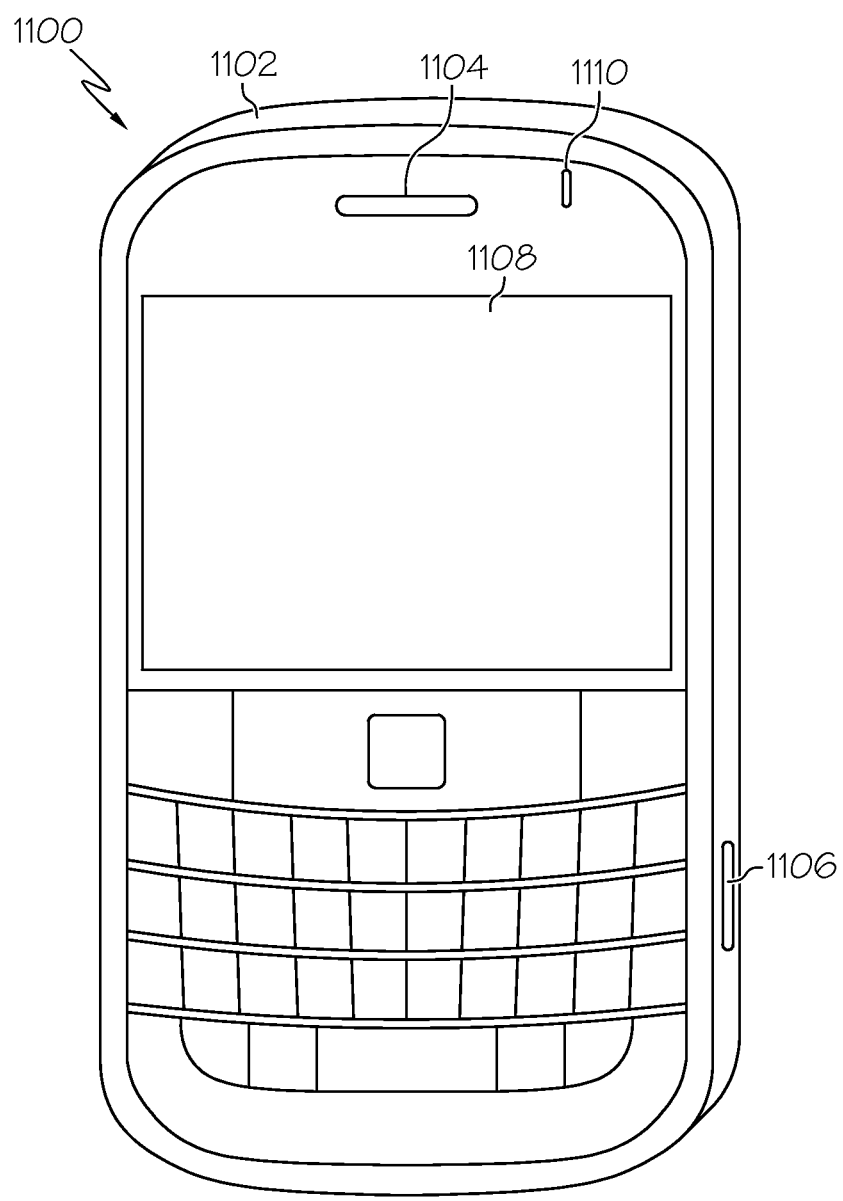
FIG. 11 is an example handheld communications device, according to one example.

FIG. 11 is an example handheld communications device 1100, according to one example. The example handheld communications device 1100 shows a portable electronic device 1102, such as a Personal Digital Assistant (PDA), a smart-phone, a cellular telephone, a tablet computer, or any other type of portable electronic device. In general, a handheld device refers to any device that is sized, shaped and designed to be held or carried in a human hand. The portable electronic device 1102 includes a wireless communications subsystem, described below, that allows the portable electronic device to receive a wireless signal to trigger the emission of an audible location-aiding signal.

The portable electronic device 1102 includes an earpiece speaker 1104 that is used to generate output audio to a user engaged in, for example, a telephone call. The portable electronic device 1102 of one example further includes a loudspeaker 1106 that is used to produce sound at a level that is greater than is safely produced by the earpiece speaker 1104 since the earpiece speaker is located near the ear of the user. In various examples, the loudspeaker 1106 is used to produce location-aiding audible signals 276, as are described above. The use of a loudspeaker 1106 allows for louder sound signals to be produced to more effectively be heard at a distance from the portable electronic device 1102.

The portable electronic device 1102 has a display 1108. The display 1108 depicted in FIG. 11 is an alpha numeric display capable of displaying various icons as indicators of a corresponding status or event within the portable electronic device 1102.

Figure 13:
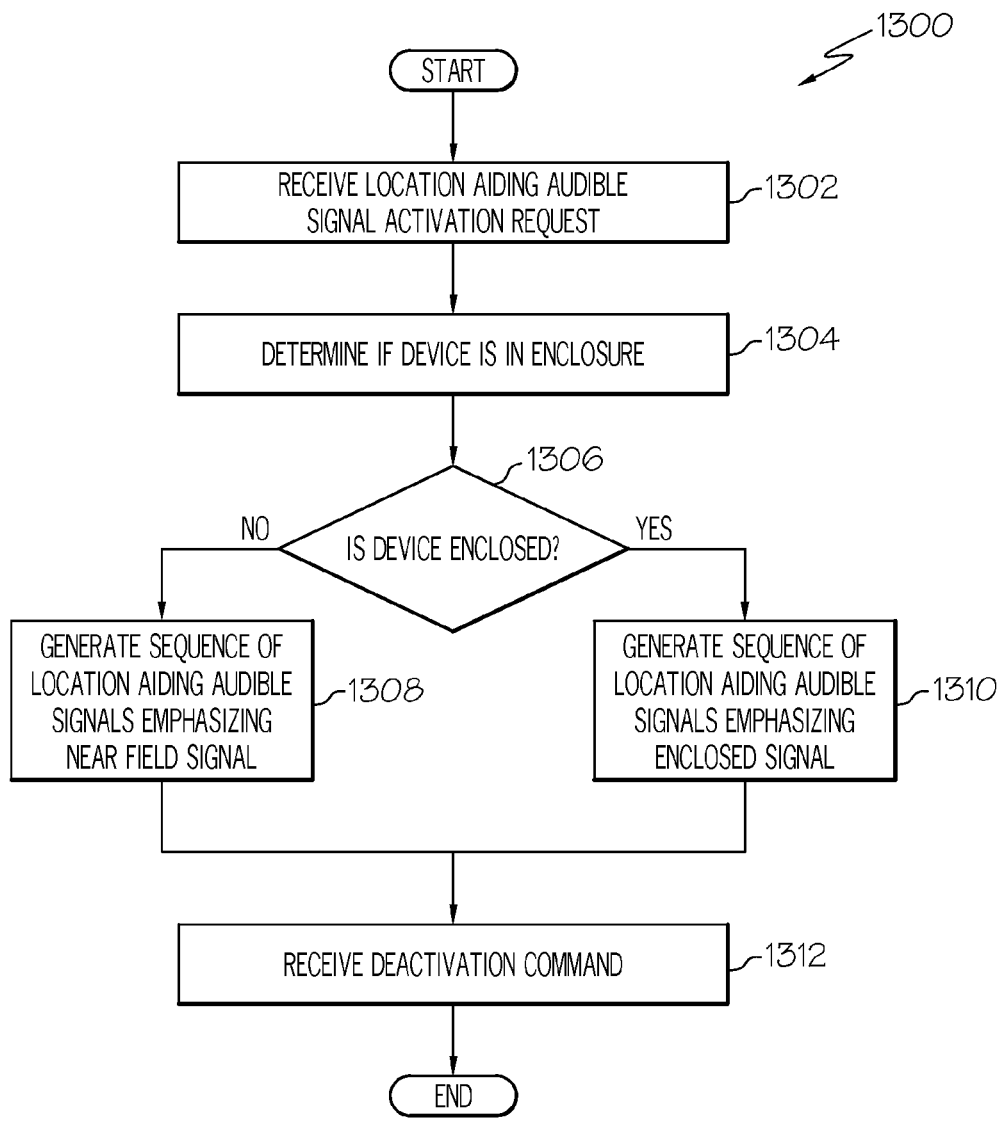
FIG. 13 illustrates an activate emission of location-aiding audible signals, according to one example.

FIG. 13 illustrates an activate emission of location-aiding audible signals 1300, according to one example. The activate emission of location-aiding audible signals 1300 begins by receiving, at 1302, a location-aiding audible signal activation signal at an electronic device, as is described above. The activate emission of location-aiding audible signals 1300 continues by determining, at 1304, if it is likely the device that is to emit the location-aiding audible signals is within an enclosed space. The device receiving the activation signal is able to use various techniques to determine if it is likely that it is within an enclosure. An example of analysis of data produced by input devices whose inputs are able to be analyzed by a processor within the device to determine that it is likely that the device is within an enclosure include analyzing sensed light by light sensors such as a light sensing photocell or a device mounted camera. Further examples include analysis of ambient noise measurements made by internal microphones and analysis of any reflections of sounds, such as tones, that are emitted by a transducer on the device. In general, any technique that is able to determine or estimate that it is likely that the device is within an enclosure is able to be performed at this step.

The activate emission of location-aiding audible signals 1300 branches, at 1306, based upon the determination that it is likely that the device is enclosed. If the device is determined to likely be enclosed, one example generates, at 1310, a sequence of location-aiding audible signals that emphasizes the enclosed device location-aiding audible signal 270. As discussed above, a sequence of location-aiding audible signals that emphasizes the enclosed device location-aiding audible signal 270 is able to include a sequence where the enclosed device location-aiding audible signal is emitted during every other period within the sequence and where the near field location-aiding audible signal 272 and the far field location-aiding audible signal 274 are alternatively emitted during time periods in-between the time periods during which the enclosed device location-aiding audible signal 270 is emitted. One example is a repeating sequence emitting the following signals in the following order: 1) enclosed device location-aiding audible signal 270, the 2) near field location-aiding audible signal 272, 3) the enclosed device location-aiding audible signal 270, and the 4) far field device location-aiding audible signal 270.

If the device is not determined to likely be enclosed, one example generates, at 1308, a sequence of location-aiding audible signals that emphasizes the near field location-aiding audible signal 270. Similar to the above described sequence that emphasizes the enclosed device location-aiding audible signal 270, a sequence of location-aiding audible signals that emphasizes the near field location-aiding audible signal 270 is able to include a sequence where the near field location-aiding audible signal 272 is emitted during every other period within the sequence and where the enclosed device location-aiding audible signal 270 and the far field location-aiding audible signal 274 are alternatively emitted during time periods in-between the time periods during which the near field location-aiding audible signal 272 is emitted. One example is a repeating sequence emitting the following signals in the following order: 1) near field location-aiding audible signal 272, the 2) enclosed device location-aiding audible signal 270, the 3) near field location-aiding audible signal 270, and the 4) far field device location-aiding audible signal 270.

The activate emission of location-aiding audible signals 1300 of one example continues emitting these signals until it receives, at 1312, a deactivation command. In various examples, a deactivation command is able to be a user input on the emitting device, such as by a user pressing a particular key on the device or pressing any key on the device. Alternative examples of a deactivation command is a particular wireless signal received by the emitting device. The activate emission of location-aiding audible signals 1300 process then ends.

Figure 14:
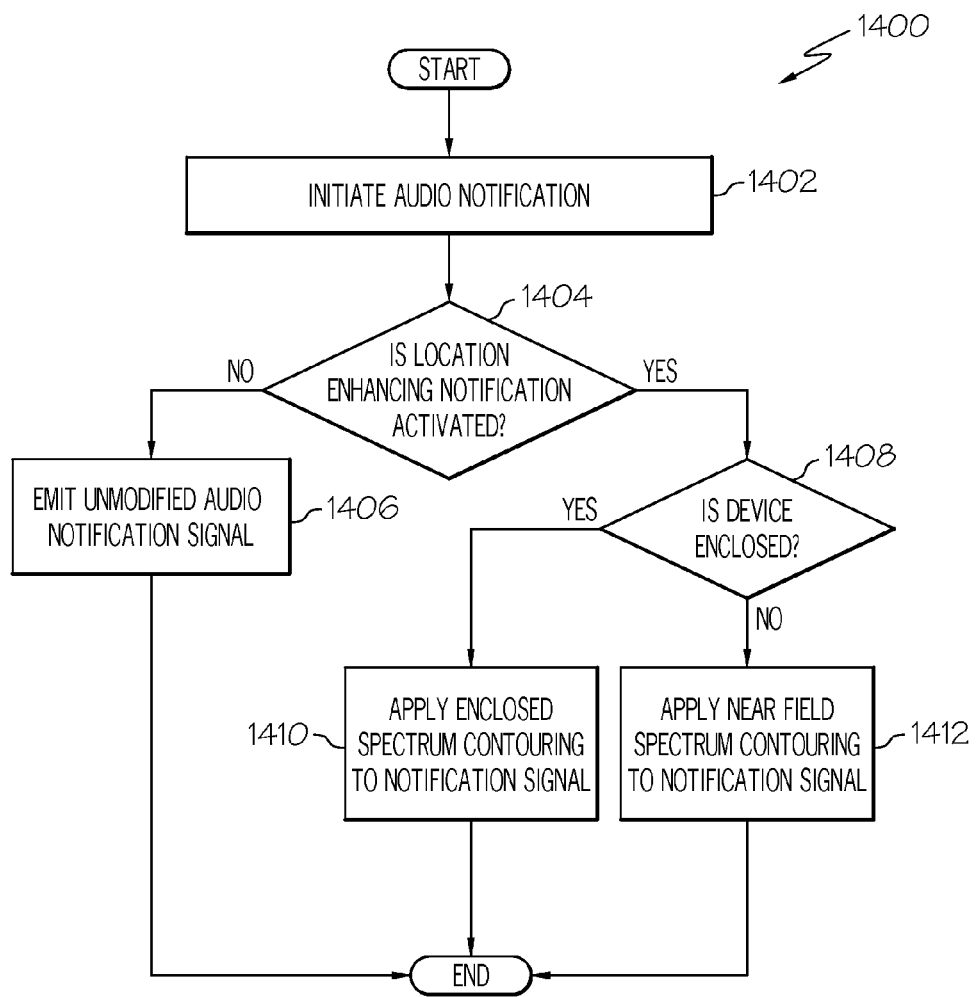
FIG. 14 illustrates an audio notification modification process, in accordance with one example.

FIG. 14 illustrates an audio notification modification process 1400, in accordance with one example. Audio notification sounds in some examples are defined by notification recordings, such as digital recordings of sounds, songs, music, or other audio signals. In general, notification recordings are able to define any audio content this is to be emitted by a device. The audio notification sounds defined by the notification recordings are processed by a device and emitted as an audio notification to notify a user of an event. The audio notification modification process 1400 is performed in some examples to spectrally modify all emitted audio notification sounds to enhance a human's ability to locate the source of the sound. The spectral modification of audio notification sounds in one example is a user controlled option that is able to be enabled or disabled for some or all audio notifications. In one example, a user controlled configuration parameter enables or disables the spectral modification of the audio notification signal.

The audio notification modification process 1400 begins by initiating, at 1402, an audio notification. In one example, a cellular telephone initiates an audio notification when an incoming call or data message is received by that cellular telephone. In various examples, the audio notification consists of an arbitrary audio signal such as a portion of music, natural or synthesized sounds, and other audio notifications that are used by a device to audibly indicate that a user may want to investigate the occurrence of an event occurring in the device.

The audio notification modification process 1400 continues by determining, at 1404, if the location enhancing audible notifications function is activated. As discussed above, this function is able to be activated or deactivated under user control of a user settable device configuration parameter. The function is also able to be activated or deactivated by any technique that controls the processing of the audio notification modification process 1400. The activation of the location enhancing audible notifications function is able to be accomplished in any suitable form, such as by receiving a wireless transmission, by a manual activation of a control or other input, or by a wired input such as would be found in a crosswalk signal. If it is determined that the location enhancing audible notifications function is not activated, unmodified audio notification signals are emitted, at 1406. This generally corresponds to conventional audio notifications as are generated by, for example, cellular telephones.

If it is determined that the location enhancing audible notifications function is activated, a determination is made, at 1408, if it is likely that the device is enclosed. An example of a determination that it is likely that a device is enclosed is described above with regards to the activate emission of location-aiding audible signals 1300. If it is determined that it is likely that the device is enclosed, the audio notification modification process 1400 continues by applying, at 1410, the enclosed spectrum contouring to the audio notification signal. An example of applying the enclosed spectrum contouring is described below. The audio notification modification process 1400 then ends.

If it is determined that it is not likely that the device is enclosed, the audio notification modification process 1400 continues by applying, at 1412, the near field spectrum contouring to the audio notification signal. An example of applying the near field spectrum contouring is described below. The audio notification modification process 1400 then ends.

Figure 15:
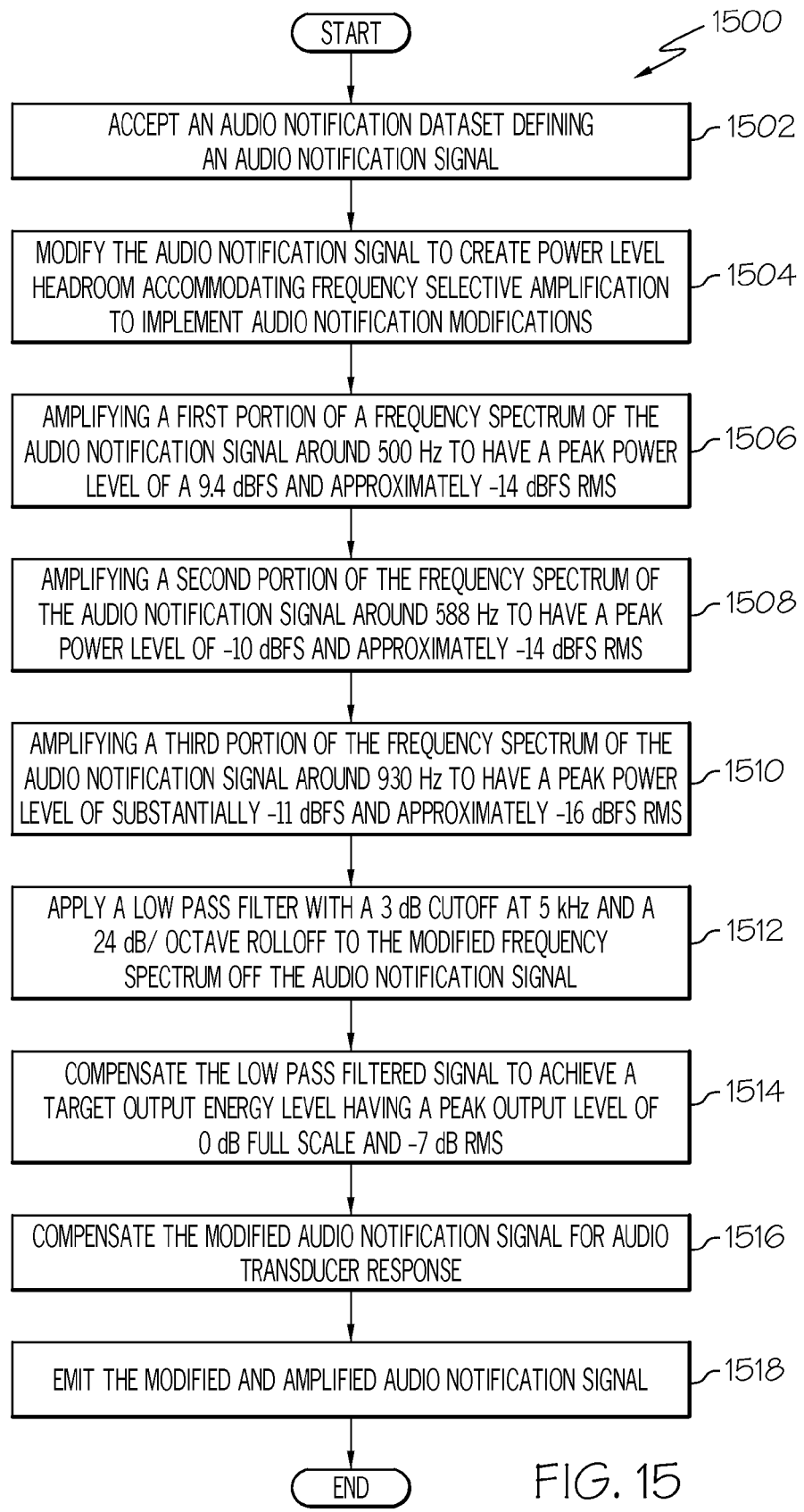
FIG. 15 illustrates an enclosed spectrum contouring process, according to one example.

FIG. 15 illustrates an enclosed spectrum contouring process 1500, according to one example. The enclosed spectrum contouring process 1500 is performed in one example in conjunction with the audio notification modification process 1400, described above. The enclosed spectrum contouring process 1500 begins by receiving, at 1502, an audio notification data set that defines an audio notification signal. Audio notification signals are discussed above and are able to be received in any form, such as by wireless or wired data communications, on an electronically readable medium, or through any technique. The enclosed spectrum contouring process 1500 continues by modifying, at 1504, the audio notification signal to create a power level headroom to accommodate frequency selective amplification to implement the below described audio notification signal modifications. In one example, as is described below, portions of the frequency spectrum of the audio notification signal are amplified to create a modified audio notification signal. The amplification of these frequency spectrum portions of the audio notification signal may cause distortion of the signal if its energy level is not first reduced by the modification to create a power level headroom.

The enclosed spectrum contouring process 1500 continues by modifying, at 1506, the audio notification signal by providing a spectral boost, such as by amplifying a first portion of the frequency spectrum of the audio notification signal, in the vicinity of 500 Hz such that the peak of the first portion of the frequency spectrum has a peak power level of −9.4 dB relative to full scale (dBFS) and such that this particular portion of the frequency spectrum has approximately −14 dB RMS power relative to full scale.

The enclosed spectrum contouring process 1500 continues by modifying, at 1508, the audio notification signal by providing a spectral boost, such as by amplifying a second portion of the frequency spectrum of the audio notification signal, at substantially 588 Hz such that the peak of the second portion of the frequency spectrum has a peak power level of substantially −10 dB relative to full scale (dBFS) and such that this particular portion of the frequency spectrum has approximately −14 dB RMS power relative to full scale.

The enclosed spectrum contouring process 1500 continues by modifying, at 1510, the audio notification signal by providing a spectral boost, such as by amplifying a third portion of the frequency spectrum of the audio notification signal, at substantially 930 Hz such that the peak of the third portion of the frequency spectrum has a peak power level of substantially −11 dB relative to full scale (dBFS) and such that this particular portion of the frequency spectrum has approximately −16 dB RMS power relative to full scale (dBFS). The enclosed spectrum contouring process 1500 then applies, at 1512, a low pass filter to the modified audio notification signal. The low pass filter of one example has a 3 dB cutoff at 5 KHz and a 24 dB/octave rolloff. The low pass filtered audio notification signal is compensated, at 1514, to achieve a target output energy level having a peak output level of 0 dB Full Scale and −7 dB RMS.

The enclosed spectrum contouring process 1500 in one example compensates, at 1516, the audio notification signal for the audio transducer response of the particular device that will emit the created enclosed location-aiding audible signal. In several examples, a transducer is used to emit the enclosed location-aiding audible signal. The transducer may have a variation in input signal to output sound response over the frequency range of the enclosed location-aiding audible signal. In order to preserve the desired spectral content of the produced enclosed location-aiding audible signal, some examples perform a frequency domain compensation to cause the generated enclosed location-aiding audible signal to be essentially pre-distorted to compensate for the distortion to be introduced by the transceiver and possibly by the recording process, reproduction electronics, or other components. The enclosed spectrum contouring process 1500 continues by emitting, at 1518, the modified and amplified audio notification signal, such as through a transducer. The process then ends.

In various examples, the enclosed spectrum contouring process 1500 is performed by a digital signal processor that is included in the device emitting the modified and amplified audio notification signal. In further examples, the enclosed spectrum contouring process 1500 is performed by a separate device and the modified and amplified audio notification signal is stored in the device for latter playback during audio notification by the device.

Figure 16:
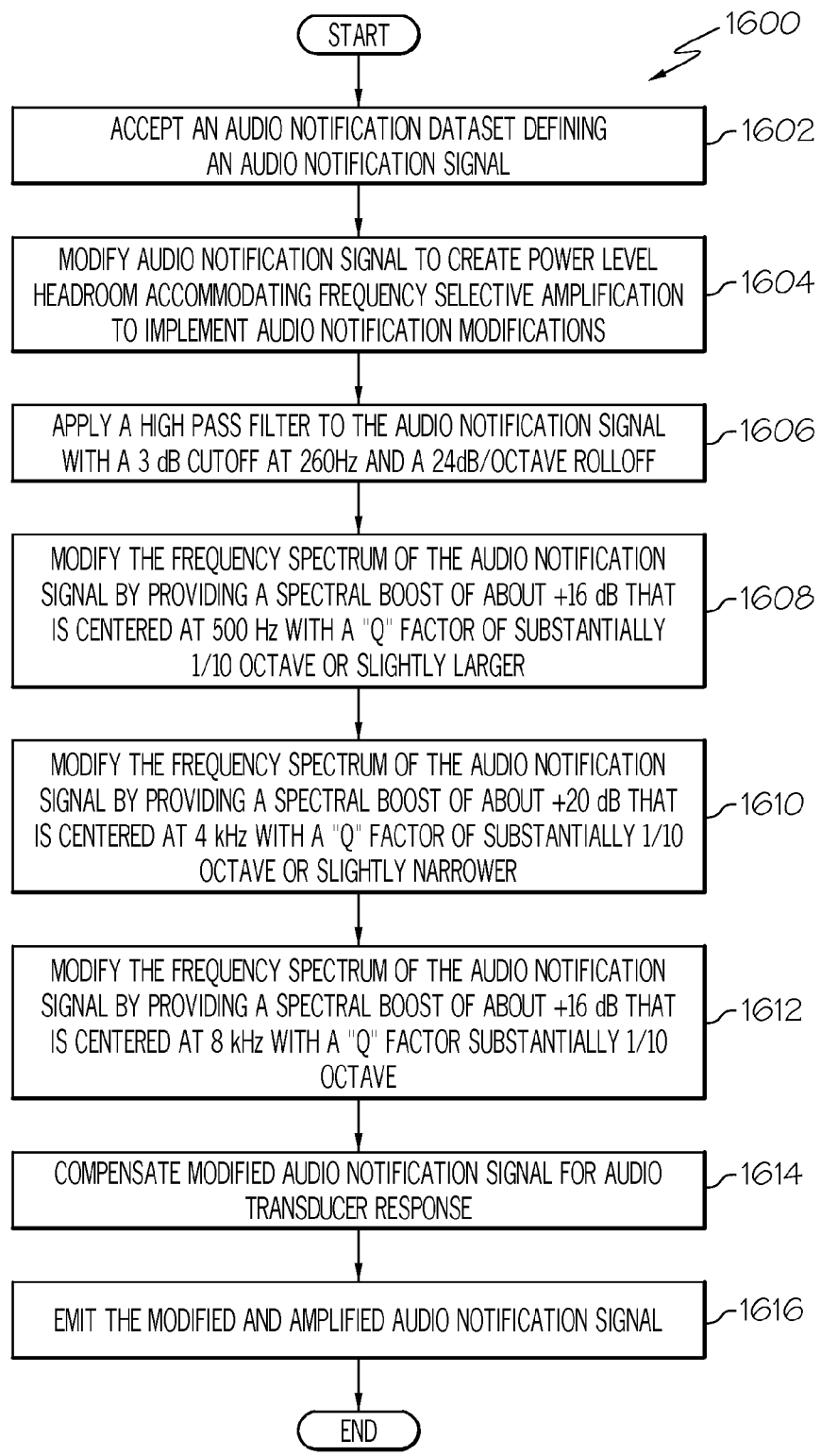
FIG. 16 illustrates a near field spectrum contouring process, according to one example.

FIG. 16 illustrates a near field spectrum contouring process 1600, according to one example. The near field spectrum contouring process 1600 is performed in conjunction with the audio notification modification process 1400, described above. The near field spectrum contouring process 1600 begins by receiving, at 1602, an audio notification data set that defines an audio notification signal. As discussed above, the audio notification data set is able to be received in any form or through any type of media. Various types of audio notification signals are also discussed above. The near field spectrum contouring process 1600 continues by modifying, at 1604, the audio notification signal to create a power level headroom to accommodate frequency selective amplification to implement the below described audio notification modifications. This modifying to create a power level headroom is similar to that described above for the enclosed spectrum contouring process 1500.

The near field spectrum contouring process 1600 continues by applying, at 1606, a high pass filter to the audio notification signal with a 3 dB cutoff at 260 Hz and a 24 dB/octave rolloff. The near field spectrum contouring process 1600 continues by providing, at 1608, a spectral boost of about +16 dB that is centered at 500 Hz. In one example, this portion of the spectrum has a "Q" factor substantially $1/10$ octave or slightly larger. The near field spectrum contouring process 1600 continues by providing, at 1610, a spectral boost of about +20 dB that is centered at 4 kHz. In one example, this portion of the spectrum has a "Q" factor of substantially $1/10$ octave or slightly narrower. The near field spectrum contouring process 1600 continues by providing, at 1612, a spectral boost of about +16 dB that is centered at 8 kHz. In one example, this portion of the spectrum has a "Q" factor substantially $1/10$ octave. In one example, the spectral boosts described above are provided by a digital signal processor that amplifies portions of the frequency spectrum of the high pass filtered audio notification signal, where those portions of the frequency spectrum are defined by the above listed center frequencies and "Q" factor resonant bandwidths.

As described above, some examples compensate, at 1614, the audio notification signal for the response of the audio transducer in order to ensure that the emitted audio notification signal has the desired spectral content. This compensation is not generally required. The near field spectrum contouring process 1600 continues by emitting, at 1616, the modified and amplified audio notification signal, such as through a transducer. The process then ends.

Figure 17:
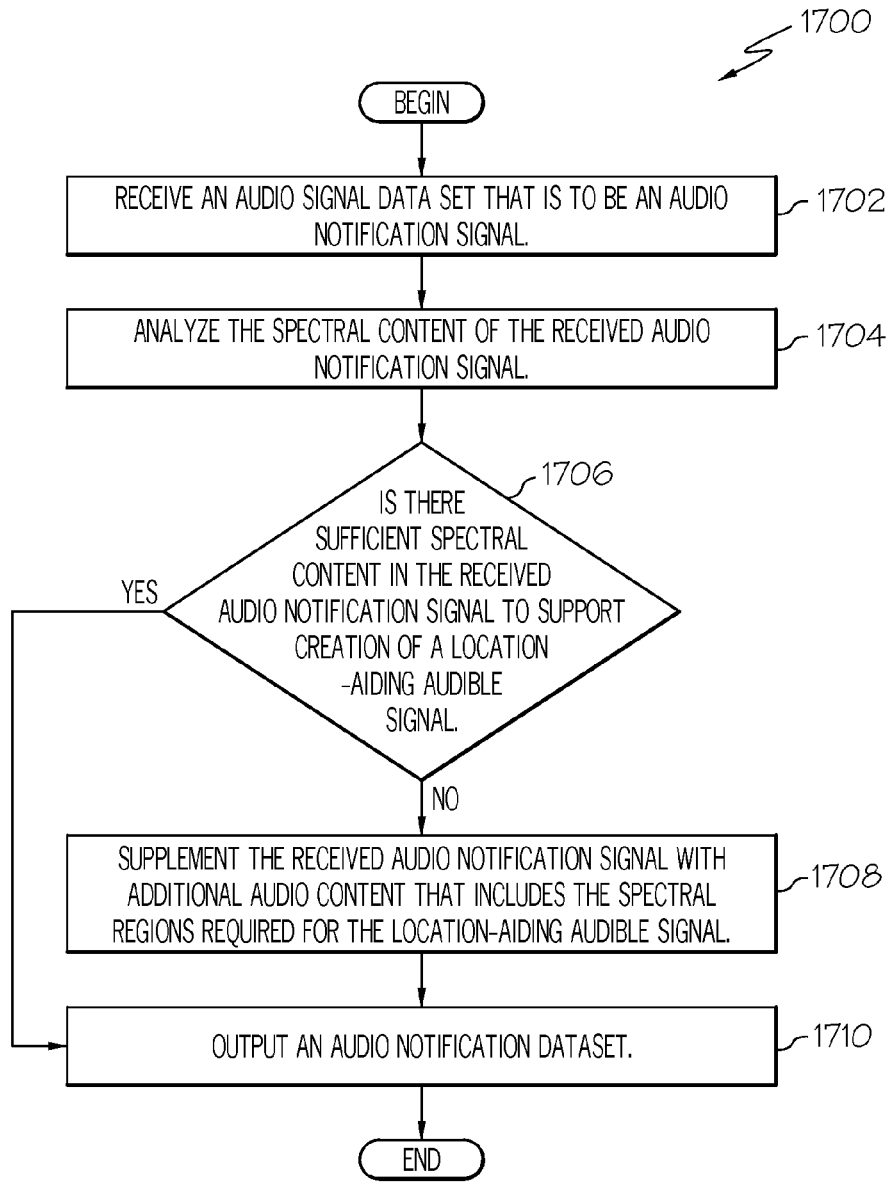
FIG. 17 illustrates an audio signal spectral supplementing process, in accordance with one example.

FIG. 17 illustrates an audio signal spectral supplementing process 1700, in accordance with one example. As described above, location-aiding audible signals are able to be based upon any audio signal, such as music, recorded voices, or other audio signals. These audio signals are then modified by the above described processing to exhibit spectral characteristics that have been found to aid in efficient location determination by human listeners. In some instances, the audio signals do not contain significant energy in the spectral regions that are amplified by the above described processing, such as the enclosed spectrum contouring process 1500 and near field spectrum contouring process 1600. In order to produce location-aiding audible signals that are able to efficiently support locating of the emitter by a human listener, the audio signal spectral supplementing process 1700 supplements a received audio signal that is to be used as an audio notification signal to add spectral energy in the necessary spectral portions of the audio signal in order to properly support creation of location-aiding audible signals.

The audio signal spectral supplementing process 1700 begins by receiving, at 1702, an audio signal data set that is to be an audio notification signal. The received audio signal data set is able to be any audio signal, such as music, voice, noises, or any other type of audio content. The audio signal spectral supplementing process 1700 continues by analyzing, at 1704, the spectral content of the received audio notification signal. In one example, the spectral content of the received audio notification signal is analyzed prior to performing the enclosed spectrum contouring process 1500 to ensure that significant spectral energy exists in the vicinity of 500 Hz, 588 Hz, and 930 Hz, and also that there is sufficient spectral content below 5 kHz. Similarly, prior to performing the near field spectrum contouring process 1600, the audio signal is analyzed to determine if significant energy exists in the vicinity of 500 Hz, 4 kHz, and 8 kHz, and also that there is sufficient spectral content between 260 Hz and 9 kHz.

The audio signal spectral supplementing process 1700 determines, at 1706, if there is sufficient spectral content in the received audio notification signal to support creation of a location-aiding audible signal. Examples of such sufficient spectral content for two component location-aiding audible signals are listed above. If it is determined that there is not sufficient spectral content to support creation of a location-aiding audible signal, the audio signal spectral supplementing process 1700 continues to supplement, at 1708, the received audio notification signal with additional audio content that includes the spectral regions required for the location-aiding audible signal. In one example, the audio notification signal is supplemented with additional audio content that contains spectral energy within the bandwidth extending from at least within substantially $1/16$ of an octave around 500 Hz to at least within substantially $1/16$ of an octave around 8 kHz. For example, pink noise, background audio such as music, melodic tones, or other audio signals are able to be used as additional audio content that is additively combined with the received audio notification signal.

If it is determined that there is sufficient spectral content to support creation of a location-aiding audible signal or after supplementing the received audio signal, the audio signal spectral supplementing process 1700 outputs, at 1710, an audio notification dataset. In one example, the outputted audio notification dataset is accepted by the enclosed spectrum contouring process 1500, the near field spectrum contouring process 1600, or both the enclosed spectrum contouring process 1500 and the near field spectrum contouring process 1600 for the above described processing of those modification processes. The audio signal spectral supplementing process 1700 then ends.

As is discussed above, effective location-aiding audible signals are able to have variations from the example values stated in the above signal generation process descriptions. The above described processing to produce effective location-aiding audible signals is able to have variations in the values of the above listed center frequencies of spectral modifications of up to about $\frac{1}{16}$ of an octave. These processes are also able to vary the resonant bandwidths, or "Q" values, of amplified portions of the spectrum by up to about $\frac{1}{10}$ of an octave and also vary amplification by up to about ±3 dB for the above stated boost or gain values for portions of the audio spectrum.

Figure 12:
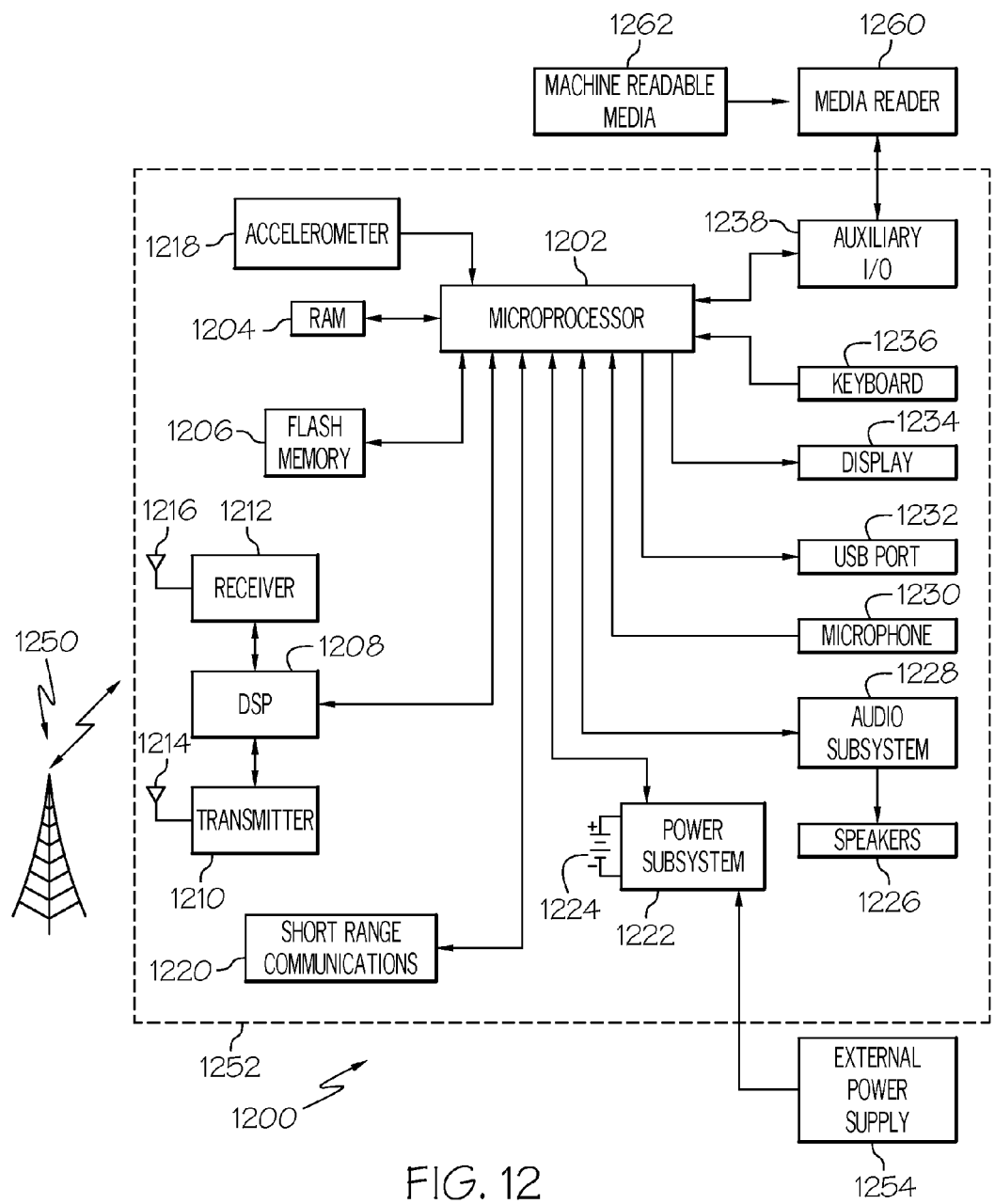
FIG. 12 is a block diagram of an electronic device and associated components in which the systems and methods disclosed herein may be implemented.

FIG. 12 is a block diagram of an electronic device and associated components 1200 in which the systems and methods disclosed herein may be implemented. In this example, an electronic device 1252 is a wireless two-way communication device that is able to provide one or both of voice and data communication capabilities. Such electronic devices communicate with a wireless voice or data network 1250 via any suitable wireless communication protocol or protocols. Wireless voice communication is performed using either analog or digital wireless communication protocols according to the network 1250 to which the wireless communication device is connected. Data communication to and from the electronic device 1252 support exchanging data with other computer systems through any suitable network, such as the Internet. Examples of electronic devices that are able to incorporate the above described systems and methods include data pagers, data messaging devices, cellular telephones, or a data communication device that may or may not include telephony capabilities.

The illustrated electronic device 1252 is an example electronic wireless communication device includes two-way wireless communication components to provide wireless data communication with a wireless data network, a wireless voice network, or both. Such electronic devices incorporate a wireless communication component that includes communication subsystem elements such as a wireless transmitter 1210, a wireless receiver 1212, and associated components such as one or more antenna elements 1214 and 1216. A digital signal processor (DSP) 1208 performs processing to extract data from received wireless signals and to generate signals to be transmitted. The particular design of the communication subsystem is dependent upon the communication network and associated wireless communication protocols with which the device is intended to operate.

Data communication with the electronic device 1252 generally includes receiving data, such as a text message or web page download, through the receiver 1212 and providing that received data to the microprocessor 1202. The microprocessor 1202 is then able to further process the received data for output to the display 1234 or to other devices such as an auxiliary I/O device 1238 or through the Universal Serial Bus (USB) port 1232. The electronic device 1252 also allows a user to create data items, such as e-mail messages, using the keyboard 1236 in conjunction with the display 1234 and possibly with data received through an auxiliary I/O device 1238. Such composed items are then able to be transmitted over a communication network through the transmitter 1210.

The electronic device 1252 performs voice communications by providing received signals from the receiver 1212 to the audio subsystem 1228 for reproduction by speakers 1226. A user's voice is able to be converted to electrical signals from microphone 1230 for transmission by transmitter 1210.

A short-range communication subsystem 1220 provides communication between the electronic device 1252 and different systems or devices. Examples of short-range communication subsystems 1220 include an infrared device and associated circuits and components, or a Radio Frequency based communication subsystem such as a Bluetooth®, Zigbee®, Wi-Fi or Wi-MAX communication subsystem to provide for communication with similarly-enabled systems and devices. In various examples, the short-range communications subsystem 1220 is able to receive location-aiding audible signal activation requests that cause the electronic device 1252 to emit location-aiding audible signals, as is described above.

The electronic device 1252 includes a microprocessor 1202 that controls device operations for the electronic device 1252. The microprocessor 1202 interacts with the above described communication subsystem elements to implement and control wireless communication with the network 1250. The microprocessor 1202 further performs control and data exchange functions by interacting with, for example, flash memory 1206, random access memory (RAM) 1204, auxiliary input/output (I/O) device 1238, USB Port 1232, display 1234, accelerometer 1218, keyboard 1236, audio subsystem 1228, microphone 1230, a short-range communication subsystem 1220, a power subsystem 1222, an accelerometer 1218, and any other device subsystems.

An internal power pack, such as a battery 1224, is connected to a power subsystem 1222 to provide power to the circuits of the electronic device 1252. The power subsystem 1222 includes power distribution circuitry to supply electric power to the various components of the electronic device 1252 and also includes battery charging circuitry to support recharging the battery 1224. An external power supply 1254 is able to be connected to the power subsystem 1222. The power subsystem 1222 includes a battery monitoring circuit that provide a status of one or more battery conditions, such as remaining capacity, temperature, voltage, current draw, and the like.

The USB port 1232 provides data communication between the electronic device 1252 and one or more external devices. Data communication through USB port 1232 enables various user data, such as data files or configuration parameters for the electronic device 1252 to be exchanged between the electronic device 1252 and an external device. The USB port 1232 is also able to be used to convey external power to the power subsystem 1222 from a suitable external power supply.

Operating system software used by the microprocessor 1202 is stored in flash memory 1206. In addition to, or in place of, flash memory 1206, a battery backed-up RAM or other non-volatile storage data elements are able to store operating systems, other executable programs, or both. As an example, a computer executable program configured to perform the activate emission of location-aiding audible signals 1300, as described above, is included in a software module stored in flash memory 1206.

Flash memory 1206 is also able to store data that is used by programs executing on the microprocessor 1202. For example, definitions of location-aiding audible signals, as are described above, are able to be stored in flash memory 1206. Definitions of other parameters for the emission of location-aiding audible signals, such as fixed or variable time durations for the emission of each different location-aiding audible signals, the pattern in which to emit the different location-aiding audible signals, a duration of quiet periods between the different location-aiding audible signals, and other such information. The definition of various location-aiding audible signals is able to be stored in any suitable format. Examples of storage formats for location-aiding audible signals include formats incorporating lossy or lossless data compression, definitions of frequency spectrum characteristics, or formats specifying digitized time domain signals. The definitions of the location-aiding audible signals is able to be provided as part of the manufacturing process for the electronic device 1252 or loaded into the flash memory 1206 of the electronic device 1252 through, for example, the wireless network 1250, an auxiliary I/O device 1238, USB port 1232, short-range communication subsystem 1220, or any combination of these interfaces.

The definitions of the location-aiding audible signals, such as are stored in flash memory 1206, are received in one example by the audio subsystem 1228. The audio subsystem 1228 transforms these definitions into signals to be delivered to speakers 1226. The speakers 1226 emit these location-aiding audible signals into the environment to assist a user in finding the electronic device 1252. In further examples, the audio subsystem 1228, either alone or in conjunction with microprocessor 1202, performs part or all of the generate enclosed location-aiding audible signal generation process 800, the generate near field location-aiding audible signal generation process 900, and the generate far field location-aiding audible signal generation process 1000, that are described above.

RAM memory 1204 is used to store data produced or used by microprocessor 1202. RAM memory is further able to temporarily store program data from flash memory 1206 or from other storage locations. RAM 1204 is also used to store data received via wireless communication signals or through wired communication.

The microprocessor 1202 in some examples executes operating system software as well as various other software applications such as user applications, small, special purpose applications referred to as "apps," and the like. Some software, such as operating system and other basic user functions such as address books are able to be provided as part of the manufacturing process for the electronic device.

In addition to loading applications as part of a manufacturing process, further applications are able to be loaded onto the electronic device 1252 through, for example, the wireless network 1250, an auxiliary I/O device 1238, USB port 1232, short-range communication subsystem 1220, or any combination of these interfaces. Once these applications are loaded into the electronic device 1252, these applications are executed by the microprocessor 1202.

A media reader 1260 is able to be connected to an auxiliary I/O device 1238 to allow, for example, loading computer readable program code of a computer program product into the electronic device 1252 for storage into flash memory 1206. One example of a media reader 1260 is an optical drive such as a CD/DVD drive, which may be used to store data to and read data from a computer readable medium or storage product such as computer readable storage media 1262. Examples of suitable computer readable storage media include optical storage media such as a CD or DVD, magnetic media, or any other suitable data storage device. The media reader 1260 is alternatively able to be connected to the electronic device through the USB port 1232 or computer readable program code is alternatively able to be provided to the electronic device 1252 through the wireless network 1250.

Information Processing System

The present invention can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for producing a location-aiding audible signal, the method comprising:
   defining a near field location-aiding audible signal comprising audible noise processed by band-pass filters with spectral peaks at about 500 Hz, 4 kHz, and 8 Khz;
   defining a far field location-aiding audible signal comprising a plurality of simultaneously occurring fundamental tone frequencies, the far field location-aiding audible signal further comprising a plurality of respective harmonic components for each fundamental tone frequency;
   emitting, during each of a first set of time durations, the near field location-aiding audible signal; and
   emitting, during a second set of time durations, the far field location-aiding audible signal, the second set of time durations being interleaved with the first set of time durations.

2. The method of claim 1, wherein the defining the near field location-aiding audible signal comprises:
   generating a pink noise audio signal with a bandwidth extending from at least 500 Hz to at least 8 kHz;
   amplifying a first bandwidth of the pink noise audio signal, the first bandwidth having a resonant bandpass centered substantially around 500 Hz;
   amplifying a second bandwidth of the pink noise audio signal, the second bandwidth having a resonant bandpass substantially around 4 kHz; and
   amplifying a third bandwidth of the pink noise audio signal, the third bandwidth having a resonant bandpass centered substantially around 8 kHz.

3. The method of claim 1, wherein the defining a near field location-aiding audible signal comprising:
   receiving an audio notification signal;
   amplifying a first bandwidth of the audio notification signal, the first bandwidth having a resonant bandpass centered substantially around 500 Hz;
   amplifying a second bandwidth of the audio notification signal, the second bandwidth having a resonant bandpass centered substantially around 4 kHz; and
   amplifying a third bandwidth of the audio notification signal, the third bandwidth having a resonant bandpass centered substantially around 8 kHz.

4. The method of claim 3, further comprising:
   determining that the audio notification signal has spectral energy extending from at least substantially around 500 Hz to substantially around 8 kHz; and
   supplementing, prior to amplifying the first bandwidth, prior to amplifying the second bandwidth, and prior to amplifying the third bandwidth, the audio notification signal with additional audio content, the additional audio content comprising spectral energy within the bandwidth extending from at least substantially around 500 Hz to at least substantially around 8 kHz.

5. The method of claim 1, wherein the far field location-aiding audible signal comprises harmonics and inter-modulation products of the plurality of simultaneously occurring fundamental tone frequencies, the harmonics and inter-modulation products extending at least to substantially 12 kHz, and wherein
   the plurality of simultaneously occurring fundamental tone frequencies comprises a first fundamental tone frequency substantially around 2 kHz,
   the plurality of simultaneously occurring fundamental tone frequencies further comprises a second fundamental tone frequency substantially around 3.9 kHz,
   the plurality of simultaneously occurring fundamental tone frequencies further comprises a third fundamental tone frequency substantially around 4.2 kHz,
   the plurality of simultaneously occurring fundamental tone frequencies further comprise a fourth fundamental tone frequency substantially around 8 kHz, and
   the plurality of simultaneously occurring fundamental tone frequencies further comprises a fifth fundamental tone frequency substantially around 9 kHz.

6. The method of claim 1, the method further comprising:
   defining an enclosed location-aiding audible signal comprising a plurality of tone sets, wherein each tone set has a respective fundamental frequency and further includes harmonic tones related to the respective fundamental frequency, the plurality of tone sets comprising a first fundamental frequency substantially around 500 Hz, a second fundamental frequency substantially around 588 Hz, and a third fundamental frequency substantially around 930 Hz; and
   emitting, during each of a third set of time durations, the near field location-aiding audible signal, the third set of time durations being interleaved with the first set of time durations and the second set of time durations.

7. The method of claim 6, wherein the defining the enclosed location-aiding audible signal comprises:
   generating a first square wave substantially around 500 Hz;
   generating a second square wave substantially around 588 Hz;
   generating a third square wave substantially around 930 Hz;
   creating a low pass filtered signal by combining the first square wave, the second square wave and the third square wave and applying a low pass filter with a 3 dB cutoff substantially around 5 KHz; and
   compensating the low pass filtered signal to achieve a target output energy level.

8. The method of claim 7, wherein the enclosed location-aiding audible signal further comprises at least one of harmonics and inter-modulation products produced by a combination of at least two of the first square wave, the second square wave, and the third square wave.

9. The method of claim 7, wherein the defining the enclosed location-aiding audible signal comprises:
   receiving an audio notification signal;
   amplifying a first portion of a frequency spectrum of the audio notification signal, the first portion having a spectral amplitude peak substantially around 500 Hz;
   amplifying a second portion of the frequency spectrum of the audio notification signal, the second portion having a spectral amplitude peak substantially around 588 Hz;
   amplifying a third portion of the frequency spectrum of the audio notification signal, the third portion having a spectral amplitude peak substantially around 930 Hz;
   applying, subsequent to the amplifying the first portion, amplifying the second portion, and amplifying the third portion, a low pass filter with a 3 dB cutoff substantially around 5 KHz; and
   compensating, after applying the low pass filter, the audio notification signal to achieve a target output energy level.

10. The method of claim 1, further comprising:
    receiving an audio notification signal;
    determining that the audio notification signal does not contain spectral energy substantially around 500 Hz to at least substantially around 8 kHz; and supplementing, in response to determining that the audio notification signal does not contain spectral energy substantially around 500 Hz to at least substantially around 8 kHz, the audio notification signal with additional audio content, the additional audio content comprising spectral energy extending from at least substantially around 500 Hz to at least substantially around 8 kHz.

11. A location-aiding audible signal creation device, comprising:
a near field location-aiding audible signal generator configured to define a near field location-aiding audible signal comprising broad-bandwidth audible noise with spectral portions selectively modified to create respective spectral amplitude peaks substantially around 500 Hz, substantially around 4 kHz and substantially around 8 kHz;
a far field location-aiding audible signal generator configured to define a far field location-aiding audible signal comprising a plurality of simultaneously occurring fundamental tone frequencies, the far field location-aiding audible signal further comprising a plurality of respective harmonic components for each fundamental tone frequency; and
a temporal interleaver configured to:
output, during each of a first set of time durations, the near field location-aiding audible signal; and
output, during a second set of time durations, the far field location-aiding audible signal, the second set of time durations being interleaved with the first set of time durations.

12. The location-aiding audible signal creation device of claim 11, wherein the first set of time durations and the second set of time durations are each substantially one-half second.

13. The location-aiding audible signal creation device of claim 11, wherein the near field location-aiding audible signal generator is configured to:
generate a pink noise audio signal with a bandwidth extending from at least 500 Hz to at least 8 kHz;
amplify a first bandwidth of the pink noise audio signal, the first bandwidth having a resonant bandpass centered substantially around 500 Hz;
amplify a second bandwidth of the pink noise audio signal, the second bandwidth having a resonant bandpass centered substantially around 4 kHz; and
amplify a third bandwidth of the pink noise audio signal, the third bandwidth having a resonant bandpass centered substantially around 8 kHz.

14. The location-aiding audible signal creation device of claim 11, wherein the near field location-aiding audible signal generator is configured to:
receive an audio notification signal;
amplify a first bandwidth of the audio notification signal, the first bandwidth having a resonant bandpass centered around 500 Hz;
amplify a second bandwidth of the audio notification signal, the second bandwidth having a resonant bandpass centered substantially around 4 kHz; and
amplify a third bandwidth of the audio notification signal, the third bandwidth having a resonant bandpass centered substantially around 8 kHz.

15. The location-aiding audible signal creation device of claim 11, wherein the far field location-aiding audible signal comprises harmonics and inter-modulation products of the plurality of simultaneously occurring fundamental tone frequencies, the harmonics and inter-modulation products extending at least to substantially 12 kHz, and wherein
the plurality of simultaneously occurring fundamental tone frequencies comprises a first fundamental tone frequency substantially around 2 kHz,
the plurality of simultaneously occurring fundamental tone frequencies further comprises a second fundamental tone frequency substantially around 3.9 kHz,
the plurality of simultaneously occurring fundamental tone frequencies further comprises a third fundamental tone frequency substantially around 4.2 kHz,
the plurality of simultaneously occurring fundamental tone frequencies further comprise a fourth fundamental tone frequency substantially around 8 kHz, and
the plurality of simultaneously occurring fundamental tone frequencies further comprises a fifth fundamental tone frequency substantially around 9 kHz.

16. The location-aiding audible signal creation device of claim 11, further comprising:
a enclosed location-aiding audible signal generator configured to define an enclosed location-aiding audible signal comprising a plurality of tone sets, wherein each tone set has a respective fundamental frequency and further includes harmonic tones related to the respective fundamental frequency, the plurality of tone sets comprising a first fundamental frequency substantially around 500 Hz, a second fundamental frequency substantially around 588 Hz, and a third fundamental frequency substantially around 930 Hz, and
wherein the temporal interleaver is further configured to output, during each of a third set of time durations, the near field location-aiding audible signal, the third set of time durations being interleaved with the first set of time durations and the second set of time durations.

17. The location-aiding audible signal creation device of claim 16, wherein the enclosed location-aiding audible signal generator is configured to:
generate a first square wave substantially around 500 Hz;
generate a second square wave substantially around 588 Hz;
generate a third square wave substantially around 930 Hz;
create a low pass filtered signal by combining the first square wave, the second square wave and the third square wave and applying a low pass filter with a 3 dB cutoff substantially around 5 KHz; and
compensate the low pass filtered signal to achieve a target output energy level having a peak output level.

18. The location-aiding audible signal creation device of claim 16, wherein the enclosed location-aiding audible signal generator is configured to:
receive an audio notification signal;
amplify a first portion of a frequency spectrum of the audio notification signal, the first portion having a peak substantially around 500 Hz;
amplify a second portion of the frequency spectrum of the audio notification signal, the second portion having a peak substantially around 588 Hz;
amplify a third portion of the frequency spectrum of the audio notification signal, the third portion having a peak substantially around 930 Hz;
apply, subsequent to amplifying the first portion, amplifying the second portion, and amplifying the third portion, a low pass filter with a 3 dB cutoff substantially around 5 KHz; and
compensate, after applying the low pass filter, the audio notification signal to achieve a target output energy level.

19. The location-aiding audible signal creation device of claim 11, further comprising an audio processor configured to:
  receive an audio notification signal;
  determine that the audio notification signal does not contain spectral energy substantially around 500 Hz to at least substantially around 8 kHz; and
  supplement, in response to a determination that the audio notification signal does not contain spectral energy substantially around 500 Hz to at least substantially around 8 kHz, the audio notification signal with additional audio content, the additional audio content comprising spectral energy extending from at least substantially around 500 Hz to at least substantially around 8 kHz.

20. A wireless communications device, comprising:
  a processor;
  a memory, communicatively coupled to the processor, configured to store information operated upon by the processor;
  a wireless communications component configured to provide wireless data communications between the processor and a wireless data network;
  a near field location-aiding audible signal generator configured to define a near field location-aiding audible signal comprising broad-bandwidth audible noise with spectral portions selectively modified to create respective spectral amplitude peaks substantially around 500 Hz, substantially around 4 kHz and substantially around 8 kHz;
  a far field location-aiding audible signal generator configured to define a far field location-aiding audible signal comprising a plurality of simultaneously occurring fundamental tone frequencies, the far field location-aiding audible signal further comprising a plurality of respective harmonic components for each fundamental tone frequency; and
  a temporal interleaver configured to:
    output, during each of a first set of time durations, the near field location-aiding audible signal; and
    output, during a second set of time durations, the far field location-aiding audible signal, the second set of time durations being interleaved with the first set of time durations.

* * * * *